United States Patent
Ciesla et al.

(10) Patent No.: US 8,456,438 B2
(45) Date of Patent: Jun. 4, 2013

(54) USER INTERFACE SYSTEM

(75) Inventors: Craig Michael Ciesla, Mountain View, CA (US); Micah B Yairi, Daly City, CA (US); Nathaniel Mark Saal, Palo Alto, CA (US)

(73) Assignee: Tactus Technology, Inc., Fremont, CA (US)

( * ) Notice: Subject to any disclaimer, the term of this patent is extended or adjusted under 35 U.S.C. 154(b) by 0 days.

(21) Appl. No.: 13/418,233

(22) Filed: Mar. 12, 2012

(65) Prior Publication Data
US 2012/0235935 A1    Sep. 20, 2012

Related U.S. Application Data

(63) Continuation-in-part of application No. 11/969,848, filed on Jan. 4, 2008, and a continuation-in-part of application No. 12/319,334, filed on Jan. 5, 2009, now Pat. No. 8,154,527.

(60) Provisional application No. 61/451,565, filed on Mar. 10, 2011.

(51) Int. Cl.
*G06F 3/041* (2006.01)
*G09G 5/00* (2006.01)

(52) U.S. Cl.
USPC .......................................... 345/173; 345/156

(58) Field of Classification Search
USPC ............ 345/156–184, 104; 178/18.01–20.04; 434/113–114
See application file for complete search history.

(56) References Cited

U.S. PATENT DOCUMENTS

| 3,034,628 | A | 5/1962 | Wadey |
| 3,659,354 | A | 5/1972 | Sutherland |

(Continued)

FOREIGN PATENT DOCUMENTS

| WO | 2008037275 A | 4/2008 |
| WO | 2009088985 A | 7/2009 |

(Continued)

OTHER PUBLICATIONS

"Sharp Develops and Will Mass Produce New System LCD with Embedded Optical Sensors to Provide Input Capabilities Including Touch Screen and Scanner Functions," Sharp Press Release, Aug. 31, 2007, 3 pages, downloaded from the Internet at: http://sharp-world.com/corporate/news/070831.html.

(Continued)

*Primary Examiner* — Alexander Eisen
*Assistant Examiner* — Patrick F Marinelli
(74) *Attorney, Agent, or Firm* — Jeffrey Schox; Peter Miller

(57) ABSTRACT

The user interface system of the preferred embodiment includes: a layer defining a surface, a substrate supporting the layer and at least partially defining a cavity, a displacement device coupled to the cavity and adapted to expand the cavity thereby deforming a particular region of the surface, a touch sensor coupled to the substrate and adapted to sense a user touch proximate the particular region of the surface, and a display coupled to the substrate and adapted to output images to the user. The user interface system of the preferred embodiments has been specifically designed to be incorporated into an electronic device, such as the display of a mobile phone, but may be incorporated in any suitable device that interfaces with a user in both a visual and tactile manner.

22 Claims, 19 Drawing Sheets

U.S. PATENT DOCUMENTS

| | | | |
|---|---|---|---|
| 3,759,108 A | 9/1973 | Borom et al. | |
| 3,780,236 A | 12/1973 | Gross | |
| 3,818,487 A | 6/1974 | Brody et al. | |
| 4,109,118 A | 8/1978 | Kley | |
| 4,209,819 A | 6/1980 | Seignemartin | |
| 4,290,343 A | 9/1981 | Gram | |
| 4,307,268 A | 12/1981 | Harper | |
| 4,467,321 A | 8/1984 | Volnak | |
| 4,477,700 A | 10/1984 | Balash et al. | |
| 4,517,421 A | 5/1985 | Margolin | |
| 4,543,000 A | 9/1985 | Hasenbalg | |
| 4,700,025 A | 10/1987 | Hatayama et al. | |
| 4,920,343 A | 4/1990 | Schwartz | |
| 5,194,852 A | 3/1993 | More et al. | |
| 5,195,659 A | 3/1993 | Eiskant | |
| 5,212,473 A | 5/1993 | Louis | |
| 5,222,895 A * | 6/1993 | Fricke | 434/113 |
| 5,286,199 A | 2/1994 | Kipke | |
| 5,369,228 A | 11/1994 | Faust | |
| 5,412,189 A | 5/1995 | Cragun | |
| 5,459,461 A | 10/1995 | Crowley et al. | |
| 5,488,204 A | 1/1996 | Mead et al. | |
| 5,496,174 A * | 3/1996 | Garner | 434/114 |
| 5,666,112 A | 9/1997 | Crowley et al. | |
| 5,717,423 A | 2/1998 | Parker | |
| 5,729,222 A | 3/1998 | Iggulden et al. | |
| 5,742,241 A | 4/1998 | Crowley et al. | |
| 5,754,023 A | 5/1998 | Roston et al. | |
| 5,766,013 A | 6/1998 | Vuyk | |
| 5,767,839 A | 6/1998 | Rosenberg | |
| 5,835,080 A | 11/1998 | Beeteson et al. | |
| 5,880,411 A | 3/1999 | Gillespie et al. | |
| 5,889,236 A | 3/1999 | Gillespie et al. | |
| 5,917,906 A | 6/1999 | Thornton | |
| 5,943,043 A | 8/1999 | Furuhata et al. | |
| 5,977,867 A | 11/1999 | Blouin | |
| 5,982,304 A | 11/1999 | Selker et al. | |
| 6,067,116 A | 5/2000 | Yamano et al. | |
| 6,154,198 A | 11/2000 | Rosenberg | |
| 6,154,201 A | 11/2000 | Levin et al. | |
| 6,160,540 A | 12/2000 | Fishkin et al. | |
| 6,169,540 B1 | 1/2001 | Rosenberg et al. | |
| 6,188,391 B1 | 2/2001 | Seely et al. | |
| 6,218,966 B1 | 4/2001 | Goodwin et al. | |
| 6,243,074 B1 | 6/2001 | Fishkin et al. | |
| 6,243,078 B1 | 6/2001 | Rosenberg | |
| 6,268,857 B1 | 7/2001 | Fishkin et al. | |
| 6,271,828 B1 | 8/2001 | Rosenberg et al. | |
| 6,300,937 B1 | 10/2001 | Rosenberg | |
| 6,310,614 B1 | 10/2001 | Maeda et al. | |
| 6,323,846 B1 | 11/2001 | Westerman et al. | |
| 6,337,678 B1 | 1/2002 | Fish | |
| 6,354,839 B1 * | 3/2002 | Schmidt et al. | 434/113 |
| 6,356,259 B1 | 3/2002 | Maeda et al. | |
| 6,366,272 B1 | 4/2002 | Rosenberg et al. | |
| 6,369,803 B2 | 4/2002 | Brisebois et al. | |
| 6,384,743 B1 | 5/2002 | Vanderheiden | |
| 6,414,671 B1 | 7/2002 | Gillespie et al. | |
| 6,429,846 B2 | 8/2002 | Rosenberg et al. | |
| 6,437,771 B1 | 8/2002 | Rosenberg et al. | |
| 6,462,294 B2 | 10/2002 | Davidson et al. | |
| 6,469,692 B2 | 10/2002 | Rosenberg | |
| 6,486,872 B2 | 11/2002 | Rosenberg et al. | |
| 6,498,353 B2 | 12/2002 | Nagle et al. | |
| 6,501,462 B1 | 12/2002 | Garner | |
| 6,509,892 B1 | 1/2003 | Cooper et al. | |
| 6,573,844 B1 | 6/2003 | Venolia et al. | |
| 6,636,202 B2 | 10/2003 | Ishmael, Jr. et al. | |
| 6,639,581 B1 | 10/2003 | Moore et al. | |
| 6,655,788 B1 | 12/2003 | Freeman | |
| 6,657,614 B1 | 12/2003 | Ito et al. | |
| 6,667,738 B2 | 12/2003 | Murphy | |
| 6,681,031 B2 | 1/2004 | Cohen et al. | |
| 6,686,911 B1 | 2/2004 | Levin et al. | |
| 6,697,086 B2 | 2/2004 | Rosenberg et al. | |
| 6,700,556 B2 | 3/2004 | Richley et al. | |
| 6,703,924 B2 | 3/2004 | Tecu et al. | |
| 6,743,021 B2 | 6/2004 | Prince et al. | |
| 6,788,295 B1 | 9/2004 | Inkster | |
| 6,819,316 B2 | 11/2004 | Schulz et al. | |
| 6,850,222 B1 | 2/2005 | Rosenberg | |
| 6,861,961 B2 | 3/2005 | Sandbach et al. | |
| 6,877,986 B2 | 4/2005 | Fournier et al. | |
| 6,881,063 B2 | 4/2005 | Yang | |
| 6,930,234 B2 | 8/2005 | Davis | |
| 6,937,225 B1 | 8/2005 | Kehlstadt et al. | |
| 6,975,305 B2 | 12/2005 | Yamashita | |
| 6,979,164 B2 | 12/2005 | Kramer | |
| 6,982,696 B1 | 1/2006 | Shahoian | |
| 6,995,745 B2 | 2/2006 | Boon et al. | |
| 7,027,032 B2 | 4/2006 | Rosenberg et al. | |
| 7,056,051 B2 | 6/2006 | Fiffie | |
| 7,061,467 B2 | 6/2006 | Rosenberg | |
| 7,064,655 B2 | 6/2006 | Murray et al. | |
| 7,081,888 B2 | 7/2006 | Cok et al. | |
| 7,096,852 B2 | 8/2006 | Gregorio | |
| 7,102,541 B2 | 9/2006 | Rosenberg | |
| 7,104,152 B2 | 9/2006 | Levin et al. | |
| 7,106,305 B2 | 9/2006 | Rosenberg | |
| 7,106,313 B2 | 9/2006 | Schena et al. | |
| 7,109,967 B2 | 9/2006 | Hioki et al. | |
| 7,112,737 B2 | 9/2006 | Ramstein | |
| 7,113,166 B1 | 9/2006 | Rosenberg et al. | |
| 7,116,317 B2 | 10/2006 | Gregorio et al. | |
| 7,124,425 B1 | 10/2006 | Anderson, Jr. et al. | |
| 7,129,854 B2 | 10/2006 | Arneson et al. | |
| 7,131,073 B2 | 10/2006 | Rosenberg et al. | |
| 7,136,045 B2 | 11/2006 | Rosenberg et al. | |
| 7,138,977 B2 | 11/2006 | Kinerk et al. | |
| 7,138,985 B2 | 11/2006 | Nakajima | |
| 7,143,785 B2 | 12/2006 | Maerkl et al. | |
| 7,144,616 B1 | 12/2006 | Unger et al. | |
| 7,148,875 B2 | 12/2006 | Rosenberg et al. | |
| 7,151,432 B2 | 12/2006 | Tierling | |
| 7,151,527 B2 | 12/2006 | Culver | |
| 7,151,528 B2 | 12/2006 | Taylor et al. | |
| 7,154,470 B2 | 12/2006 | Tierling | |
| 7,158,112 B2 | 1/2007 | Rosenberg et al. | |
| 7,159,008 B1 | 1/2007 | Wies et al. | |
| 7,161,276 B2 | 1/2007 | Face | |
| 7,161,580 B2 | 1/2007 | Bailey et al. | |
| 7,168,042 B2 | 1/2007 | Braun et al. | |
| 7,176,903 B2 | 2/2007 | Katsuki et al. | |
| 7,182,691 B1 | 2/2007 | Schena | |
| 7,191,191 B2 | 3/2007 | Peurach et al. | |
| 7,193,607 B2 | 3/2007 | Moore et al. | |
| 7,195,170 B2 | 3/2007 | Matsumoto et al. | |
| 7,196,688 B2 | 3/2007 | Schena | |
| 7,198,137 B2 | 4/2007 | Olien | |
| 7,199,790 B2 | 4/2007 | Rosenberg et al. | |
| 7,202,851 B2 | 4/2007 | Cunningham et al. | |
| 7,205,981 B2 | 4/2007 | Cunningham | |
| 7,208,671 B2 | 4/2007 | Chu | |
| 7,209,028 B2 | 4/2007 | Boronkay et al. | |
| 7,209,117 B2 | 4/2007 | Rosenberg et al. | |
| 7,209,118 B2 | 4/2007 | Shahoian et al. | |
| 7,210,160 B2 | 4/2007 | Anderson, Jr. et al. | |
| 7,215,326 B2 | 5/2007 | Rosenberg | |
| 7,216,671 B2 | 5/2007 | Unger et al. | |
| 7,218,310 B2 | 5/2007 | Tierling et al. | |
| 7,218,313 B2 | 5/2007 | Marcus et al. | |
| 7,233,313 B2 | 6/2007 | Levin et al. | |
| 7,233,315 B2 | 6/2007 | Gregorio et al. | |
| 7,233,476 B2 | 6/2007 | Goldenberg et al. | |
| 7,236,157 B2 | 6/2007 | Schena et al. | |
| 7,245,202 B2 | 7/2007 | Levin | |
| 7,245,292 B1 | 7/2007 | Custy | |
| 7,249,951 B2 | 7/2007 | Bevirt et al. | |
| 7,250,128 B2 | 7/2007 | Unger et al. | |
| 7,253,803 B2 | 8/2007 | Schena et al. | |
| 7,253,807 B2 | 8/2007 | Nakajima | |
| 7,265,750 B2 | 9/2007 | Rosenberg | |
| 7,280,095 B2 | 10/2007 | Grant | |
| 7,283,120 B2 | 10/2007 | Grant | |
| 7,283,123 B2 | 10/2007 | Braun et al. | |
| 7,289,106 B2 | 10/2007 | Bailey et al. | |
| 7,289,111 B2 | 10/2007 | Asbill | |

| Patent No. | Date | Inventor |
|---|---|---|
| 7,307,619 B2 | 12/2007 | Cunningham et al. |
| 7,308,831 B2 | 12/2007 | Cunningham et al. |
| 7,319,374 B2 | 1/2008 | Shahoian |
| 7,336,260 B2 | 2/2008 | Martin et al. |
| 7,336,266 B2 | 2/2008 | Hayward et al. |
| 7,339,572 B2 | 3/2008 | Schena |
| 7,339,580 B2 | 3/2008 | Westerman et al. |
| 7,342,573 B2 | 3/2008 | Ryynaenen |
| 7,355,595 B2 | 4/2008 | Bathiche et al. |
| 7,369,115 B2 | 5/2008 | Cruz-Hernandez et al. |
| 7,382,357 B2 | 6/2008 | Panotopoulos et al. |
| 7,390,157 B2 | 6/2008 | Kramer |
| 7,391,861 B2 | 6/2008 | Levy |
| 7,397,466 B2 | 7/2008 | Bourdelais et al. |
| 7,403,191 B2 | 7/2008 | Sinclair |
| 7,432,910 B2 | 10/2008 | Shahoian |
| 7,432,911 B2 | 10/2008 | Skarine |
| 7,432,912 B2 | 10/2008 | Cote et al. |
| 7,433,719 B2 | 10/2008 | Dabov |
| 7,471,280 B2 | 12/2008 | Prins |
| 7,489,309 B2 | 2/2009 | Levin et al. |
| 7,511,702 B2 | 3/2009 | Hotelling |
| 7,522,152 B2 | 4/2009 | Olien et al. |
| 7,545,289 B2 | 6/2009 | Mackey et al. |
| 7,548,232 B2 | 6/2009 | Shahoian et al. |
| 7,551,161 B2 | 6/2009 | Mann |
| 7,561,142 B2 | 7/2009 | Shahoian et al. |
| 7,567,232 B2 | 7/2009 | Rosenberg |
| 7,567,243 B2 | 7/2009 | Hayward |
| 7,589,714 B2 | 9/2009 | Funaki |
| 7,592,999 B2 | 9/2009 | Rosenberg et al. |
| 7,605,800 B2 | 10/2009 | Rosenberg |
| 7,609,178 B2 | 10/2009 | Son et al. |
| 7,659,885 B2 | 2/2010 | Kraus et al. |
| 7,671,837 B2 | 3/2010 | Forsblad et al. |
| 7,679,611 B2 | 3/2010 | Schena |
| 7,679,839 B2 | 3/2010 | Polyakov et al. |
| 7,688,310 B2 | 3/2010 | Rosenberg |
| 7,701,438 B2 | 4/2010 | Chang et al. |
| 7,728,820 B2 | 6/2010 | Rosenberg et al. |
| 7,733,575 B2 | 6/2010 | Heim et al. |
| 7,743,348 B2 | 6/2010 | Robbins et al. |
| 7,755,602 B2 | 7/2010 | Tremblay et al. |
| 7,808,488 B2 | 10/2010 | Martin et al. |
| 7,834,853 B2 | 11/2010 | Finney et al. |
| 7,843,424 B2 | 11/2010 | Rosenberg et al. |
| 7,864,164 B2 | 1/2011 | Cunningham et al. |
| 7,869,589 B2 | 1/2011 | Tuovinen |
| 7,890,257 B2 | 2/2011 | Fyke et al. |
| 7,890,863 B2 | 2/2011 | Grant et al. |
| 7,920,131 B2 | 4/2011 | Westerman |
| 7,924,145 B2 | 4/2011 | Yuk et al. |
| 7,944,435 B2 | 5/2011 | Rosenberg et al. |
| 7,952,498 B2 | 5/2011 | Higa |
| 7,956,770 B2 | 6/2011 | Klinghult et al. |
| 7,973,773 B2 | 7/2011 | Pryor |
| 7,978,181 B2 | 7/2011 | Westerman |
| 7,978,183 B2 | 7/2011 | Rosenberg et al. |
| 7,978,186 B2 | 7/2011 | Vassallo et al. |
| 7,979,797 B2 | 7/2011 | Schena |
| 7,982,720 B2 | 7/2011 | Rosenberg et al. |
| 7,986,303 B2 | 7/2011 | Braun et al. |
| 7,986,306 B2 | 7/2011 | Eich et al. |
| 7,989,181 B2 | 8/2011 | Blattner et al. |
| 7,999,660 B2 | 8/2011 | Cybart et al. |
| 8,002,089 B2 | 8/2011 | Jasso et al. |
| 8,004,492 B2 | 8/2011 | Kramer et al. |
| 8,013,843 B2 | 9/2011 | Pryor |
| 8,020,095 B2 | 9/2011 | Braun et al. |
| 8,022,933 B2 | 9/2011 | Hardacker et al. |
| 8,031,181 B2 | 10/2011 | Rosenberg et al. |
| 8,044,826 B2 | 10/2011 | Yoo |
| 8,047,849 B2 * | 11/2011 | Ahn et al. ............ 434/114 |
| 8,049,734 B2 | 11/2011 | Rosenberg et al. |
| 8,059,104 B2 | 11/2011 | Shahoian et al. |
| 8,059,105 B2 | 11/2011 | Rosenberg et al. |
| 8,063,892 B2 | 11/2011 | Shahoian et al. |
| 8,063,893 B2 | 11/2011 | Rosenberg et al. |
| 8,068,605 B2 | 11/2011 | Holmberg |
| 8,077,154 B2 | 12/2011 | Emig et al. |
| 8,077,440 B2 | 12/2011 | Krabbenborg et al. |
| 8,077,941 B2 | 12/2011 | Assmann |
| 8,094,121 B2 | 1/2012 | Obermeyer et al. |
| 8,094,806 B2 | 1/2012 | Levy |
| 8,103,472 B2 | 1/2012 | Braun et al. |
| 8,106,787 B2 | 1/2012 | Nurmi |
| 8,115,745 B2 | 2/2012 | Gray |
| 8,123,660 B2 | 2/2012 | Kruse et al. |
| 8,125,347 B2 | 2/2012 | Fahn |
| 8,125,461 B2 | 2/2012 | Weber et al. |
| 8,130,202 B2 | 3/2012 | Levine et al. |
| 8,144,129 B2 | 3/2012 | Hotelling et al. |
| 8,144,271 B2 | 3/2012 | Han |
| 8,154,512 B2 | 4/2012 | Olien et al. |
| 8,154,527 B2 | 4/2012 | Ciesla et al. |
| 8,159,461 B2 | 4/2012 | Martin et al. |
| 8,162,009 B2 | 4/2012 | Chaffee |
| 8,164,573 B2 | 4/2012 | Dacosta et al. |
| 8,169,306 B2 | 5/2012 | Schmidt et al. |
| 8,169,402 B2 | 5/2012 | Shahoian et al. |
| 8,174,372 B2 | 5/2012 | Da Costa |
| 8,174,495 B2 | 5/2012 | Takashima et al. |
| 8,174,508 B2 | 5/2012 | Sinclair et al. |
| 8,174,511 B2 | 5/2012 | Takenaka et al. |
| 8,178,808 B2 | 5/2012 | Strittmatter |
| 8,179,375 B2 | 5/2012 | Ciesla et al. |
| 8,179,377 B2 | 5/2012 | Ciesla et al. |
| 8,188,989 B2 | 5/2012 | Levin et al. |
| 8,195,243 B2 | 6/2012 | Kim et al. |
| 8,199,107 B2 | 6/2012 | Xu et al. |
| 8,199,124 B2 | 6/2012 | Ciesla et al. |
| 8,203,094 B2 | 6/2012 | Mittleman et al. |
| 8,207,950 B2 | 6/2012 | Ciesla et al. |
| 8,212,772 B2 | 7/2012 | Shahoian |
| 8,217,903 B2 | 7/2012 | Ma et al. |
| 8,217,904 B2 | 7/2012 | Kim |
| 8,224,392 B2 | 7/2012 | Kim et al. |
| 8,228,305 B2 | 7/2012 | Pryor |
| 8,232,976 B2 | 7/2012 | Yun et al. |
| 8,243,038 B2 | 8/2012 | Ciesla et al. |
| 8,253,052 B2 | 8/2012 | Chen |
| 8,253,703 B2 | 8/2012 | Eldering |
| 8,279,172 B2 | 10/2012 | Braun et al. |
| 8,279,193 B1 | 10/2012 | Birnbaum et al. |
| 2001/0008396 A1 | 7/2001 | Komata |
| 2001/0043189 A1 | 11/2001 | Brisebois et al. |
| 2002/0106614 A1 * | 8/2002 | Prince et al. ............ 434/114 |
| 2002/0110237 A1 | 8/2002 | Krishnan |
| 2003/0087698 A1 | 5/2003 | Nishiumi et al. |
| 2003/0179190 A1 | 9/2003 | Franzen |
| 2003/0206153 A1 | 11/2003 | Murphy |
| 2004/0056876 A1 | 3/2004 | Nakajima |
| 2004/0056877 A1 | 3/2004 | Nakajima |
| 2004/0164968 A1 | 8/2004 | Miyamoto |
| 2004/0178006 A1 | 9/2004 | Cok |
| 2005/0007339 A1 | 1/2005 | Sato |
| 2005/0007349 A1 | 1/2005 | Vakil et al. |
| 2005/0020325 A1 | 1/2005 | Enger et al. |
| 2005/0030292 A1 | 2/2005 | Diederiks |
| 2005/0057528 A1 | 3/2005 | Kleen |
| 2005/0088417 A1 | 4/2005 | Mulligan |
| 2005/0110768 A1 | 5/2005 | Marriott et al. |
| 2005/0162408 A1 | 7/2005 | Martchovsky |
| 2005/0231489 A1 | 10/2005 | Ladouceur et al. |
| 2005/0253816 A1 | 11/2005 | Himberg et al. |
| 2005/0285846 A1 | 12/2005 | Funaki |
| 2006/0026521 A1 | 2/2006 | Hotelling et al. |
| 2006/0097991 A1 | 5/2006 | Hotelling et al. |
| 2006/0098148 A1 | 5/2006 | Kobayashi et al. |
| 2006/0118610 A1 | 6/2006 | Pihlaja et al. |
| 2006/0119586 A1 | 6/2006 | Grant et al. |
| 2006/0197753 A1 | 9/2006 | Hotelling |
| 2006/0214923 A1 | 9/2006 | Chiu et al. |
| 2006/0238495 A1 | 10/2006 | Davis |
| 2006/0238510 A1 * | 10/2006 | Panotopoulos et al. ........ 345/168 |
| 2006/0256075 A1 | 11/2006 | Anastas et al. |
| 2006/0278444 A1 | 12/2006 | Binstead |
| 2007/0013662 A1 | 1/2007 | Fauth |

| | | |
|---|---|---|
| 2007/0036492 A1 | 2/2007 | Lee |
| 2007/0085837 A1 | 4/2007 | Ricks et al. |
| 2007/0108032 A1 | 5/2007 | Matsumoto et al. |
| 2007/0122314 A1 | 5/2007 | Strand et al. |
| 2007/0152983 A1 | 7/2007 | Mckillop et al. |
| 2007/0165004 A1 | 7/2007 | Seelhammer et al. |
| 2007/0171210 A1 | 7/2007 | Chaudhri et al. |
| 2007/0182718 A1 | 8/2007 | Schoener et al. |
| 2007/0229233 A1 | 10/2007 | Dort |
| 2007/0236466 A1 | 10/2007 | Hotelling |
| 2007/0236469 A1 | 10/2007 | Woolley et al. |
| 2007/0247429 A1 | 10/2007 | Westerman |
| 2007/0254411 A1 | 11/2007 | Uhland et al. |
| 2007/0257634 A1 | 11/2007 | Leschin et al. |
| 2007/0273561 A1 | 11/2007 | Philipp |
| 2007/0296702 A1 | 12/2007 | Strawn et al. |
| 2007/0296709 A1 | 12/2007 | Guanghai |
| 2008/0010593 A1 | 1/2008 | Uusitalo et al. |
| 2008/0024459 A1 | 1/2008 | Poupyrev et al. |
| 2008/0136791 A1 | 6/2008 | Nissar |
| 2008/0138774 A1* | 6/2008 | Ahn et al. .................. 434/114 |
| 2008/0143693 A1 | 6/2008 | Schena |
| 2008/0150911 A1 | 6/2008 | Harrison |
| 2008/0165139 A1 | 7/2008 | Hotelling et al. |
| 2008/0174570 A1 | 7/2008 | Jobs et al. |
| 2008/0202251 A1 | 8/2008 | Serban et al. |
| 2008/0238448 A1 | 10/2008 | Moore et al. |
| 2008/0251368 A1 | 10/2008 | Holmberg et al. |
| 2008/0252607 A1 | 10/2008 | De Jong et al. |
| 2008/0266264 A1 | 10/2008 | Lipponen et al. |
| 2008/0286447 A1 | 11/2008 | Alden et al. |
| 2008/0291169 A1 | 11/2008 | Brenner et al. |
| 2008/0297475 A1 | 12/2008 | Woolf et al. |
| 2008/0303796 A1 | 12/2008 | Fyke |
| 2009/0002140 A1 | 1/2009 | Higa |
| 2009/0002205 A1 | 1/2009 | Klinghult et al. |
| 2009/0002328 A1* | 1/2009 | Ullrich et al. .................. 345/173 |
| 2009/0002337 A1 | 1/2009 | Chang |
| 2009/0009480 A1 | 1/2009 | Heringslack |
| 2009/0015547 A1* | 1/2009 | Franz et al. .................. 345/156 |
| 2009/0033617 A1 | 2/2009 | Lindberg et al. |
| 2009/0066672 A1 | 3/2009 | Tanabe et al. |
| 2009/0085878 A1 | 4/2009 | Heubel et al. |
| 2009/0106655 A1 | 4/2009 | Grant et al. |
| 2009/0115733 A1 | 5/2009 | Ma et al. |
| 2009/0115734 A1 | 5/2009 | Fredriksson et al. |
| 2009/0128503 A1* | 5/2009 | Grant et al. .................. 345/173 |
| 2009/0135145 A1 | 5/2009 | Chen et al. |
| 2009/0140989 A1 | 6/2009 | Ahlgren |
| 2009/0167508 A1 | 7/2009 | Fadell et al. |
| 2009/0167509 A1 | 7/2009 | Fadell et al. |
| 2009/0167677 A1 | 7/2009 | Kruse et al. |
| 2009/0167704 A1 | 7/2009 | Terlizzi et al. |
| 2009/0174673 A1 | 7/2009 | Ciesla |
| 2009/0174687 A1 | 7/2009 | Ciesla et al. |
| 2009/0181724 A1 | 7/2009 | Pettersson |
| 2009/0182501 A1 | 7/2009 | Fyke et al. |
| 2009/0195512 A1 | 8/2009 | Pettersson |
| 2009/0243998 A1 | 10/2009 | Wang |
| 2009/0250267 A1* | 10/2009 | Heubel et al. .............. 178/18.03 |
| 2009/0303022 A1 | 12/2009 | Griffin et al. |
| 2010/0043189 A1 | 2/2010 | Fukano |
| 2010/0097323 A1* | 4/2010 | Edwards et al. .............. 345/173 |
| 2010/0103116 A1 | 4/2010 | Leung et al. |
| 2010/0103137 A1 | 4/2010 | Ciesla et al. |
| 2010/0109486 A1 | 5/2010 | Polyakov et al. |
| 2010/0162109 A1 | 6/2010 | Chatterjee et al. |
| 2010/0171719 A1 | 7/2010 | Craig et al. |
| 2010/0171720 A1 | 7/2010 | Craig et al. |
| 2010/0177050 A1* | 7/2010 | Heubel et al. ................ 345/173 |
| 2010/0182245 A1* | 7/2010 | Edwards et al. .............. 345/173 |
| 2010/0295820 A1 | 11/2010 | Kikin-Gil |
| 2010/0321335 A1 | 12/2010 | Lim et al. |
| 2011/0001613 A1 | 1/2011 | Ciesla et al. |
| 2011/0012851 A1 | 1/2011 | Ciesla et al. |
| 2011/0029862 A1 | 2/2011 | Scott et al. |
| 2011/0148793 A1 | 6/2011 | Ciesla et al. |
| 2011/0148807 A1 | 6/2011 | Fryer |
| 2011/0157080 A1 | 6/2011 | Ciesla et al. |
| 2011/0175838 A1 | 7/2011 | Higa |
| 2011/0254672 A1 | 10/2011 | Ciesla et al. |
| 2011/0254709 A1 | 10/2011 | Ciesla et al. |
| 2011/0254789 A1 | 10/2011 | Ciesla et al. |
| 2012/0032886 A1 | 2/2012 | Ciesla et al. |
| 2012/0043191 A1 | 2/2012 | Kessler et al. |
| 2012/0056846 A1 | 3/2012 | Zaliva |
| 2012/0062483 A1 | 3/2012 | Ciesla et al. |
| 2012/0098789 A1 | 4/2012 | Ciesla et al. |
| 2012/0105333 A1 | 5/2012 | Maschmeyer et al. |
| 2012/0193211 A1 | 8/2012 | Ciesla et al. |
| 2012/0200528 A1 | 8/2012 | Ciesla et al. |
| 2012/0200529 A1 | 8/2012 | Ciesla et al. |
| 2012/0206364 A1 | 8/2012 | Ciesla et al. |
| 2012/0218213 A1 | 8/2012 | Ciesla et al. |
| 2012/0218214 A1 | 8/2012 | Ciesla et al. |
| 2012/0242607 A1 | 9/2012 | Ciesla et al. |
| 2012/0306787 A1 | 12/2012 | Ciesla et al. |
| 2013/0019207 A1 | 1/2013 | Rothkopf et al. |

FOREIGN PATENT DOCUMENTS

| | | |
|---|---|---|
| WO | 2010077382 A | 7/2010 |
| WO | 2010078596 A | 7/2010 |
| WO | 2010078597 A | 7/2010 |
| WO | 2011003113 A | 1/2011 |
| WO | 2011087816 A | 7/2011 |
| WO | 2011087817 A | 7/2011 |
| WO | 2011112984 A | 9/2011 |
| WO | 2011133604 A | 10/2011 |
| WO | 2011133605 A | 10/2011 |

OTHER PUBLICATIONS

Jeong et al., "Tunable Microdoublet Lens Array," Optical Society of America, Optics Express; vol. 12, No. 11. May 31, 2004, 7 Pages.

* cited by examiner

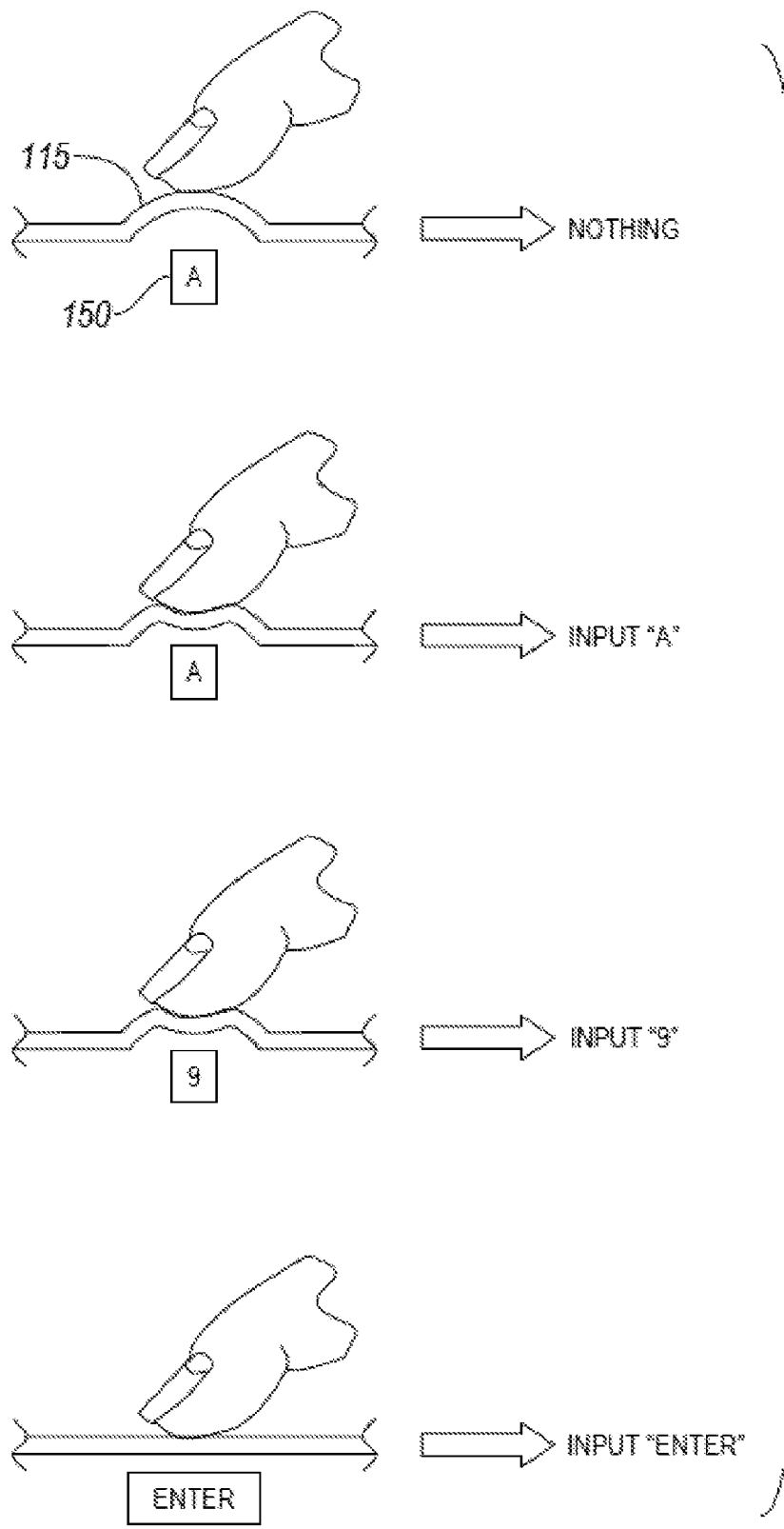

USER INTERFACE SYSTEM

CROSS-REFERENCE TO RELATED APPLICATIONS

This application claims priority to U.S. Provisional Patent Application Ser. No. 61/451,565, filed on 10 Mar. 2011 and entitled "User Interface System," which is incorporated herein by reference.

This application is a continuation-in-part of U.S. patent application Ser. No. 12/319,334, filed on 5 Jan. 2009 now U.S. Pat. No. 8,154,527 and "User Interface System," which is incorporated herein by reference, which is a continuation-in-part of U.S. patent application Ser. No. 11/969,848, filed on 4 Jan. 2008 and entitled "System and Method for Raised Touch Screens," which is incorporated herein by reference.

TECHNICAL FIELD

This invention relates generally to touch sensitive displays. More particularly, this invention relates to systems and methods for selectively raising portions of touch sensitive displays.

BACKGROUND

Touch sensitive displays, e.g., touch screens, are very useful in applications where a user can input commands and data directly on a display. Common applications for touch screens include consumer products such as cellular telephones and user interfaces for industrial process control. Depending on their specific applications, these touch sensitive displays are commonly used in devices ranging from small handheld PDAs, to medium sized tablet computers, to large pieces of industrial equipment.

It is often convenient to be able to input and output data to and from the user on the same display. Unlike a dedicated input device such as a keypad with discrete well-defined keys, most touch sensitive displays are generally flat. As a result, touch sensitive screens do not provide any tactile guidance for one or more control "buttons". Instead, touch sensitive displays rely on visual guidance for user input.

Hence a serious drawback of touch sensitive displays is its inherent difficulty to input data accurately because adjacent buttons are not distinguishable by feel. Wrongly entered key strokes are common and the user is forced to keep his or her eyes on the display. The importance of tactile guidance is readily apparent in the competition between the Apple iPhone and the BlackBerry 8800. With a limited size, the mobile phones prior to this invention could include either a large screen or tactile buttons. With this invention, mobile phones and other suitable electronic devices can include both.

BRIEF DESCRIPTION OF THE FIGURES

FIG. 17 is a schematic of the different input graphics, different cavity settings, and different user touches of the preferred embodiments.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. First Preferred Embodiment

Figure 1:
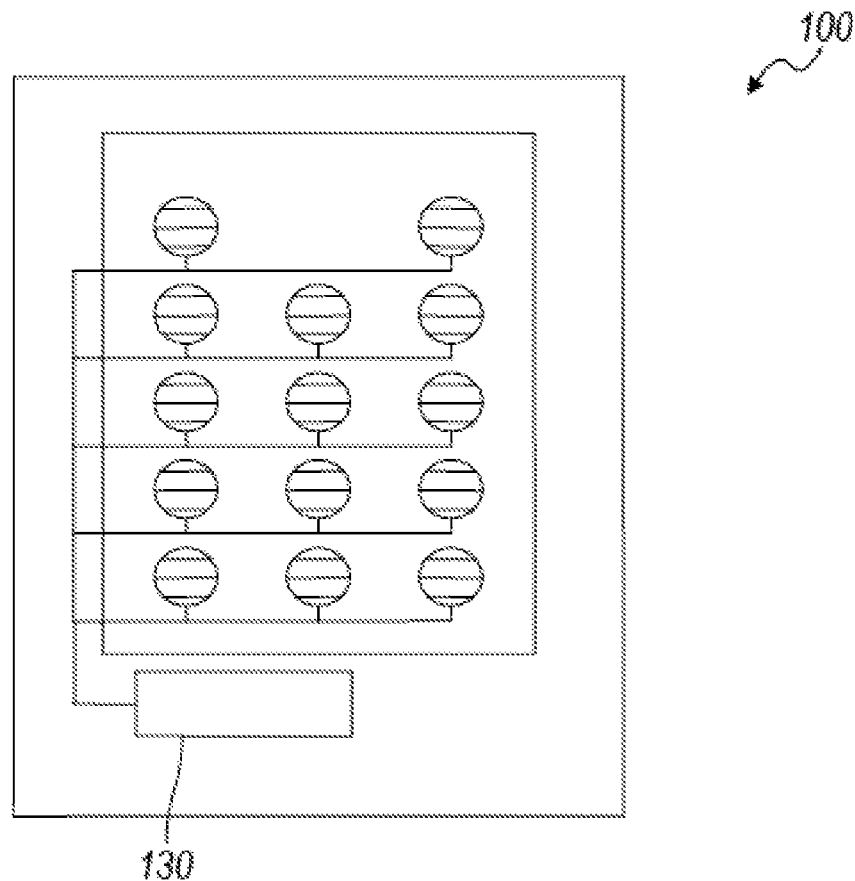
FIG. 1 is a top view of the user interface system of a preferred embodiment.
Figure 2:
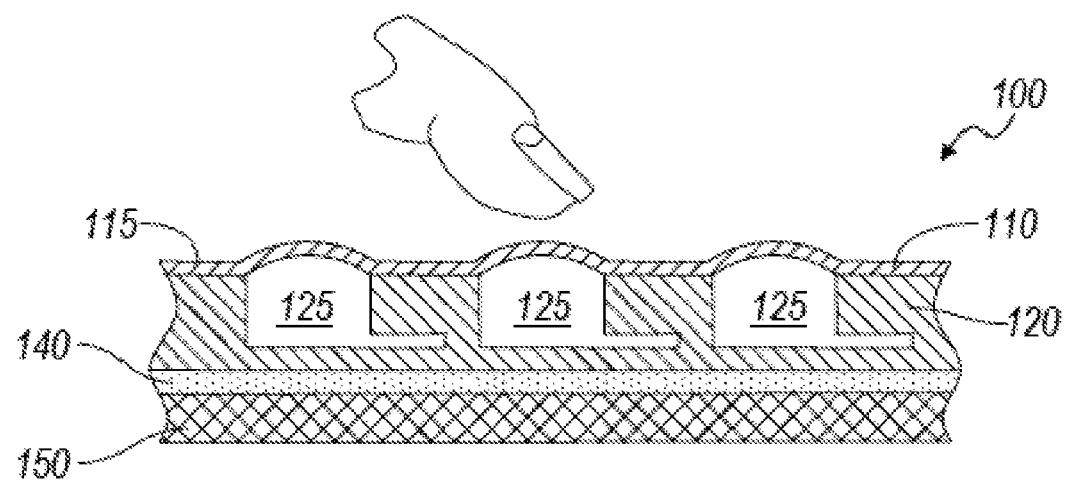
FIG. 2 is a cross-sectional view illustrating the operation of a button array in accordance to the preferred embodiments.

As shown in FIGS. 1 and 2, the user interface system 100 of the preferred embodiment includes: a layer 110 defining a surface 115, a substrate 120 supporting the layer 110 and at least partially defining a cavity 125, a displacement device 130 coupled to the cavity 125 and adapted to expand the cavity 125 thereby deforming a particular region of the surface 115, a touch sensor 140 coupled to the substrate 120 and adapted to sense a user touch proximate the particular region of the surface 115, and a display 150 coupled to the substrate 120 and adapted to output images to the user.

The user interface system 100 of the preferred embodiments has been specifically designed to be incorporated into an electronic device, such as the display of an automotive console, a desktop computer, a laptop computer, a tablet computer, a television, a radio, a desk phone, a mobile phone, a PDA, a personal navigation device, a personal media player, a camera, or a watch. The user interface system may, however, be incorporated in any suitable device that interfaces with a user in both a visual and tactile manner.

1A. The Layer and Substrate

As shown in FIG. 2, the layer 110 of the preferred embodiment functions to provide the surface 115 that interfaces with a user in a tactile manner. The surface 115 is preferably continuous, such that when swiping a finger across the surface 115 a user would not feel any interruptions or seams. The surface 115 is also preferably planar. The surface 115 is preferably arranged in a flat plane, but may alternatively be arranged in a curved plane. The layer 110 also functions to deform upon an expansion of the cavity 125, and to preferably "relaxes" or "un-deforms" back to a normal planar state upon retraction of the cavity 125. The layer 110 is preferably elastic. In one version, the layer 110 is relatively more elastic in specific areas and relatively less elastic in other areas and is deformed in the relatively more elastic areas. In another version, the layer 110 is generally uniformly elastic. In yet another version, the layer 110 includes or is made of a smart material, such as Nickel Titanium (commonly referred to as "Nitinol"), that has a selective and/or variable elasticity. The layer 110 is preferably optically transparent, but may alternatively be translucent or opaque. In addition to the transparency, the layer 110 preferably has the following properties: a high transmission, a low haze, a wide viewing angle, a minimal amount of back reflectance upon the display 150 (if the display 150 is coupled with the user interface), scratch resistant, chemical resistant, stain resistant, and relatively smooth (not tacky) to the touch. The layer 110 is preferably made from a suitable elastic material, including polymers and silicon-based elastomers such as poly-dimethylsiloxane (PDMS) or RTV Silicon (e.g., RTV Silicon 615). The layer 110 may, however, be made of any suitable material that provides the surface 115 and that deforms. In one version, the layer 110 is a single homogeneous layer less than 1 mm thick (preferably 50 to 200 microns). In another version, the layer 110 may be constructed using multiple layers or coatings from the same material or from different suitable materials.

Figure 3A:
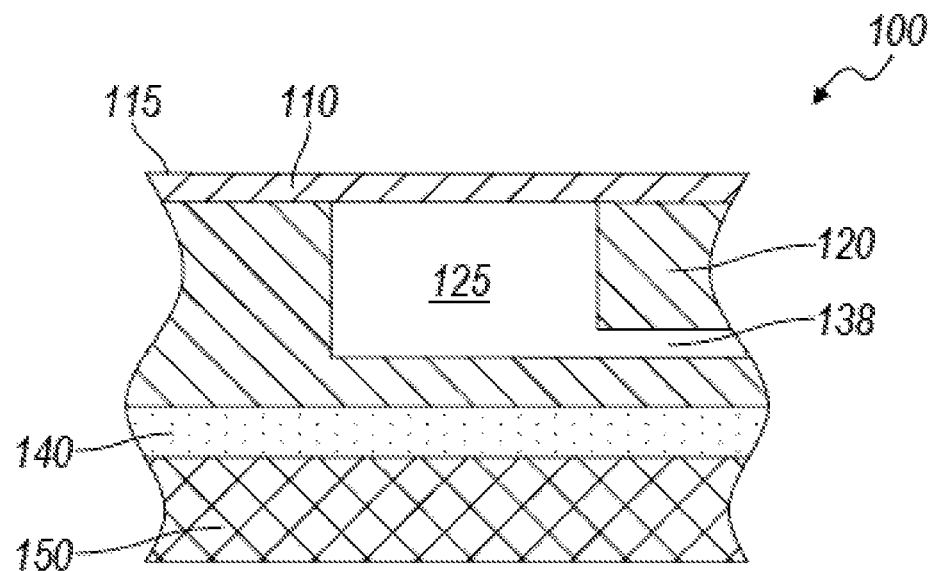
FIGS. 3a and 3b are cross-sectional views of the layer, the substrate, the cavity, the touch sensor, and the display of the preferred embodiments, with the cavity in a retracted volume setting and an expanded volume setting, respectively.
Figure 3B:
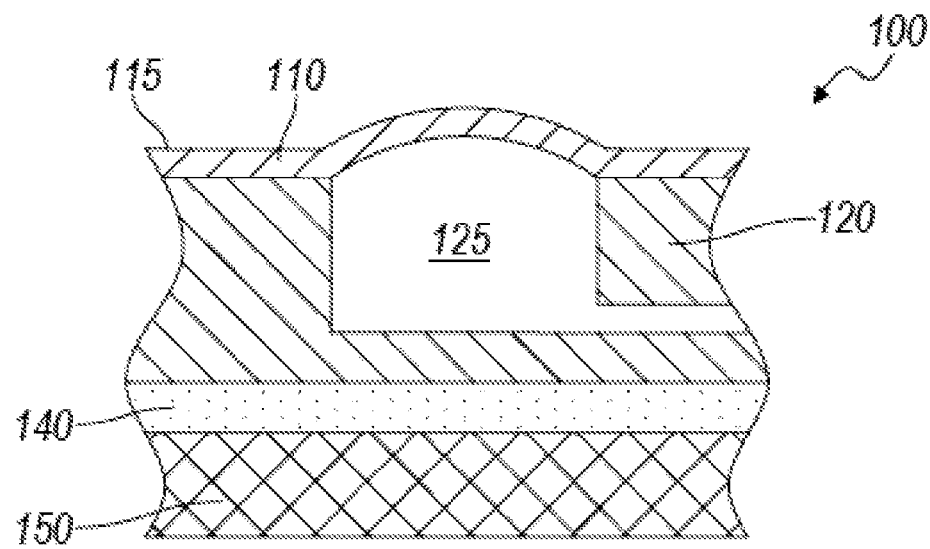
Figure 4A:
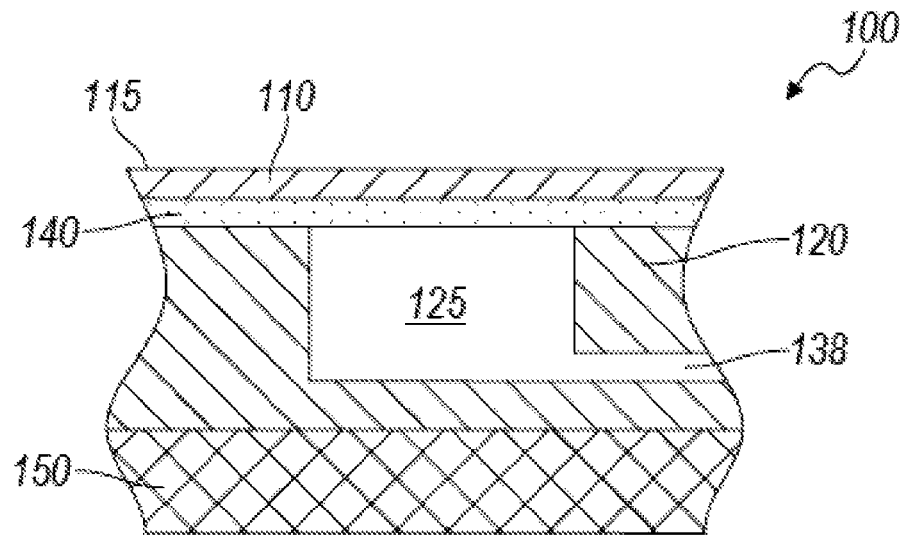
FIGS. 4a and 4b are cross-sectional views of the touch sensor located above the substrate, with the cavity in a retracted volume setting and an expanded volume setting, respectively.
Figure 4B:
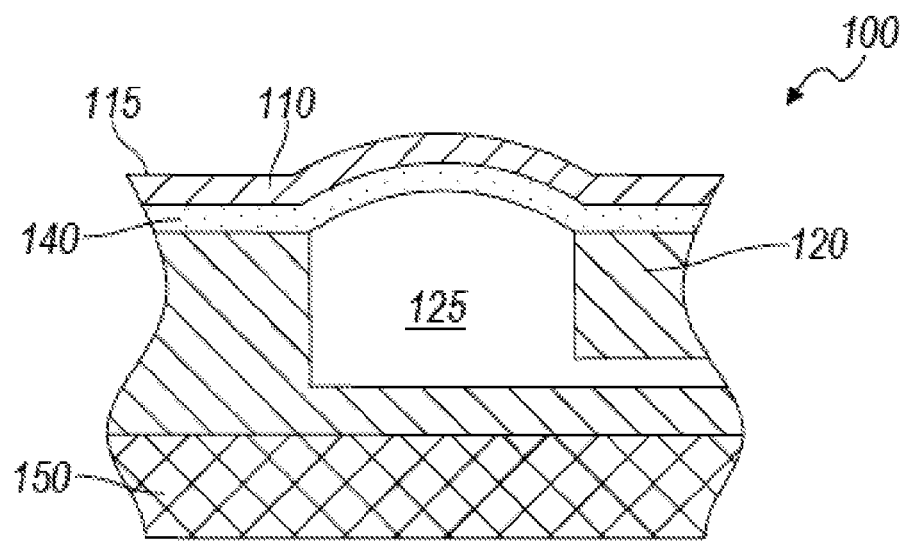
Figure 5A:
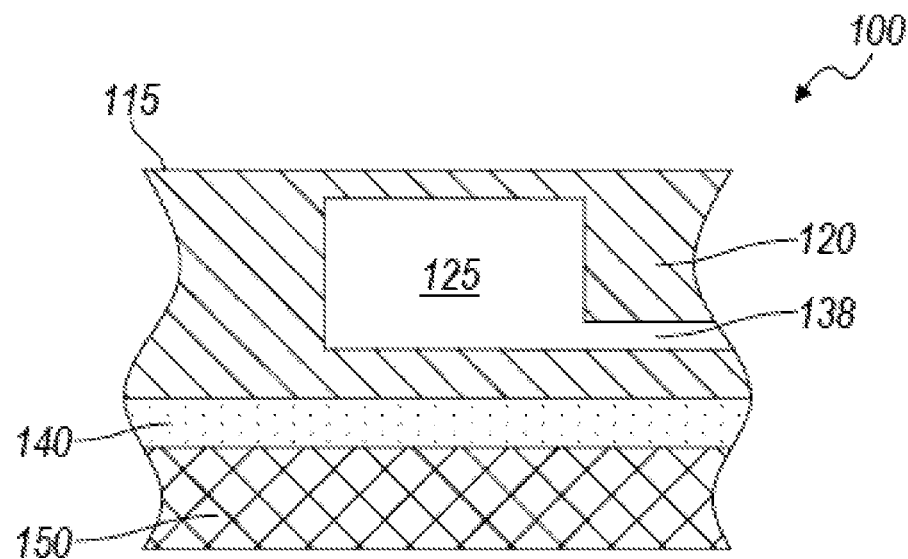
FIGS. 5a and 5b are cross-sectional views of the layer and the substrate combined as a singular structure, with the cavity in a retracted volume setting and an expanded volume setting, respectively.
Figure 5B:
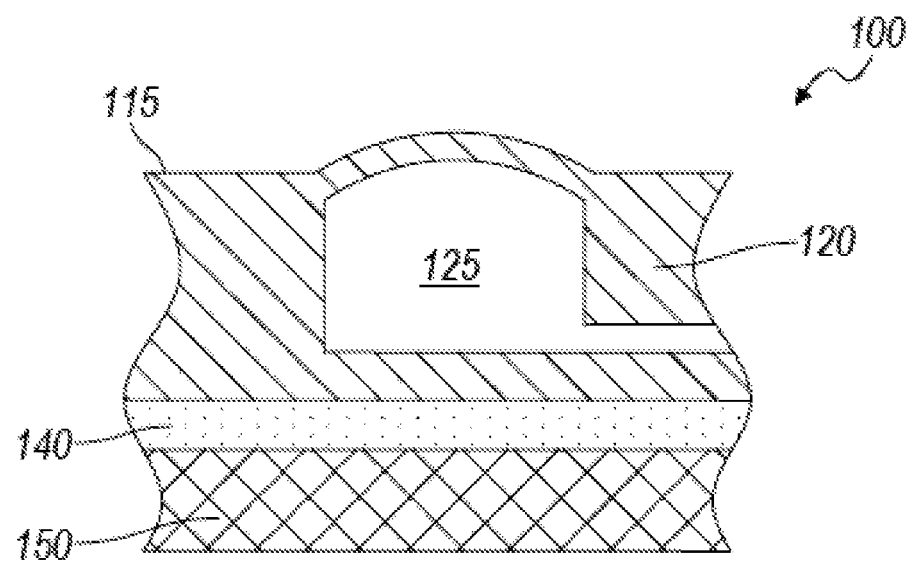
Figure 6A:
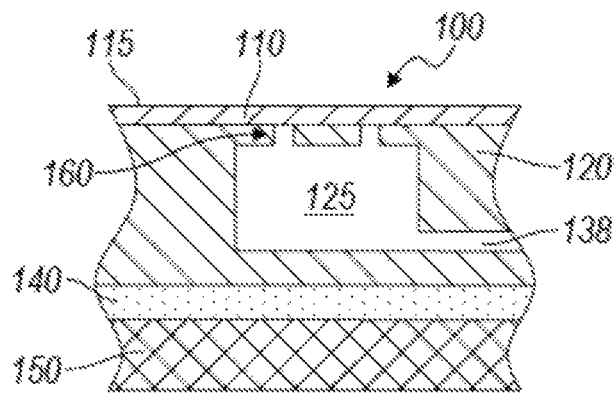
FIGS. 6a and 6b are cross-sectional views of a support member between the layer and the substrate, with the cavity in a retracted volume setting and an expanded volume setting, respectively.
Figure 6C:
FIG. 6c is a top view of the support member.
Figure 6B:
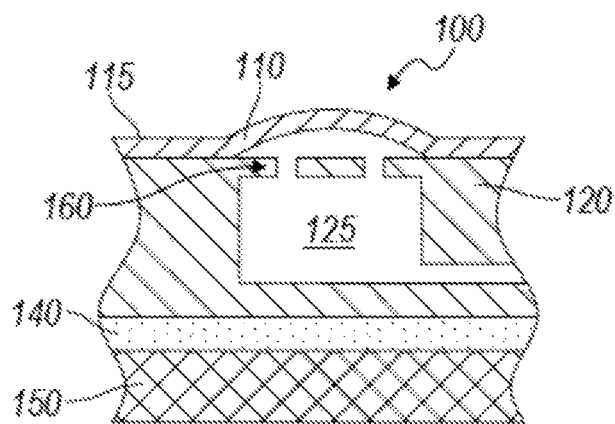
Figure 6D:
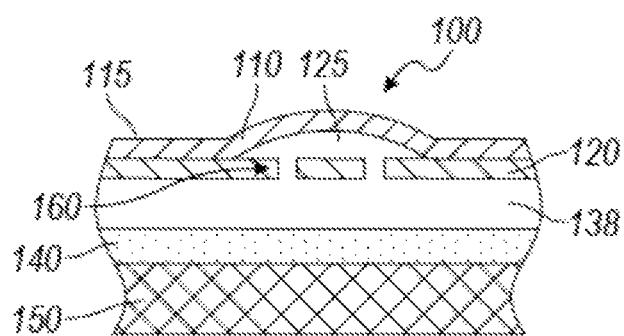
FIG. 6d is a cross-sectional view of an alternative support member that partially defines the cavity.

The substrate 120 of the preferred embodiments functions to support the layer 110 and to at least partially define the cavity 125. In one version, as shown in FIGS. 3a and 3b, the layer 110 is directly attached to the substrate 120 using an adhesive, ultra-sonic bonding, oxygen plasma surface treatment, or any other suitable techniques known to one skilled in the art. The substrate 120 and the layer 110, in this version, cooperately define the cavity 125 (with the substrate 120 defining a "container" and the layer 110 defining a "membrane" over the "container"). In another version, as shown in FIGS. 4a and 4b, the layer 110 is indirectly attached to the substrate 120 with another element, such as the touch sensor 140 and/or the display 150 located between the layer 110 and the substrate 120. The substrate 120 and the intervening element define the cavity 125 in this version. In yet another version, as shown in FIGS. 5a and 5b, the layer 110 and the substrate 120 are formed as a singular structure, which fully defines the cavity 125. In yet one more version, as shown in FIGS. 6a and 6b, the substrate 120 may include a lattice-like support member 160 under the particular region of the surface 115. When the cavity 125 is expanded and the deformation is present in the surface 115, the support member 160 functions to prevent a user from "pressing too far" into the deformation below the plane of the surface 115. When the cavity 125 is not expanded and the deformation is not present in the surface 115, the support member 160 functions to reduce (or potentially eliminate) the user from feeling "divots" in the surface 115 when swiping a finger across the surface 115. As shown in FIG. 6c, the support member 160 preferably includes holes or channels that allow for the expansion of the cavity 125 and the deformation of the surface 115. The support member 160 is preferably integrally formed with the substrate 120, but may alternatively be formed with the layer 110 or may be separately formed and later attached to the substrate 120. Finally, as shown in FIG. 6d, the support member 160 may alternatively partially define the cavity 125. The substrate 120 is preferably rigid, but may alternatively be flexible in one or more directions. The substrate 120—if located above the display 150—is preferably optically transparent, but may—if located below the display 150 or if bundled without a display 150—be translucent or opaque. The substrate 120 is preferably made from a material including polymers or glass, for example, elastomers, silicon-based organic polymers such as poly-dimethylsiloxane (PDMS), thermoset plastics such as polymethyl methacrylate (PMMA), and photocurable solvent resistant elastomers such as perfluropolyethers. The substrate 120 may, however, be made of any suitable material that supports the layer 110 and at least partially defines the cavity 125. In the preferred version, the substrate 120 is a single homogenous layer approximately 1 mm to 0.1 mm thick and can be manufactured using well-known techniques for microfluid arrays to create one or more cavities and/or micro channels. In alternative versions, the substrate 120 may be constructed using multiple layers from the same material or from different suitable materials.

As shown in FIGS. 3a and 3b, the cavity 125 of the preferred embodiment functions to hold a fluid and to have at least two volumetric settings: a retracted volume setting (shown in FIG. 3a) and an extended volume setting (shown in FIG. 3b). The fluid is preferably a liquid (such as water, glycerin, or ethylene glycol), but may alternatively be a gas (such as air, nitrogen, or argon) or any other substance (such as a gel or aerogel) that expands the cavity 125 and deforms the surface 115. In the extended volume setting, the cavity 125 extends above the plane of the surface 115, thereby deforming a particular region of the surface 115. As explained above, the cavity 125 is preferably defined by the substrate 120 and the layer 110 (or an intervening element), or by the substrate 120 and layer 110 as a singular structure. In one version, as shown in FIGS. 6a and 6b and as further explained below, the cavity 125 does not have any fluidic connection to any other elements of the user interface system 100. The displacement device 130, in this version, may be located within or adjacent to the cavity 125. In another version, the cavity 125 includes a fluidic connection via a channel to a (remotely located) displacement device 130. In both cases, the cavity 125 can be considered an "enclosed cavity" since the cavity 125 is preferably fluid tight (except for any fluidic connections to the displacement device 130). When used with a mobile phone device, the cavity 125 preferably has a diameter of 2-10 mm. When used with this or other applications, however, the cavity 125 may have any suitable dimension.

1B. The Displacement Device

The displacement device 130 of the preferred embodiment functions to modify the volume of the fluid thereby expanding the cavity 125 from the retracted volume setting to the extended volume setting and, ultimately, deforming a particular region of the surface 115. The displacement device 130 preferably modifies the volume of the fluid by (1) modifying the volume of the existing fluid in the cavity 125, or (2) adding and removing fluid to and from the cavity 125. The displacement device 130 may, however, modify the volume of the fluid by any suitable device or method. Modifying the volume of the existing fluid in the cavity 125 most likely has an advantage of lesser complexity, while adding and removing fluid to and from the cavity 125 most likely has an advantage of maintaining the deformation of the surface 115 without the need for additional energy (if valves or other lockable mechanisms are used). When used with a mobile phone device, the displacement device 130 preferably increases the volume of the fluid within the cavity 125 by approximately 0.003-0.1 ml. When used with this or other applications, however, the volume of the fluid may be increased (or possibly decreased) by any suitable amount.

Figure 7A:
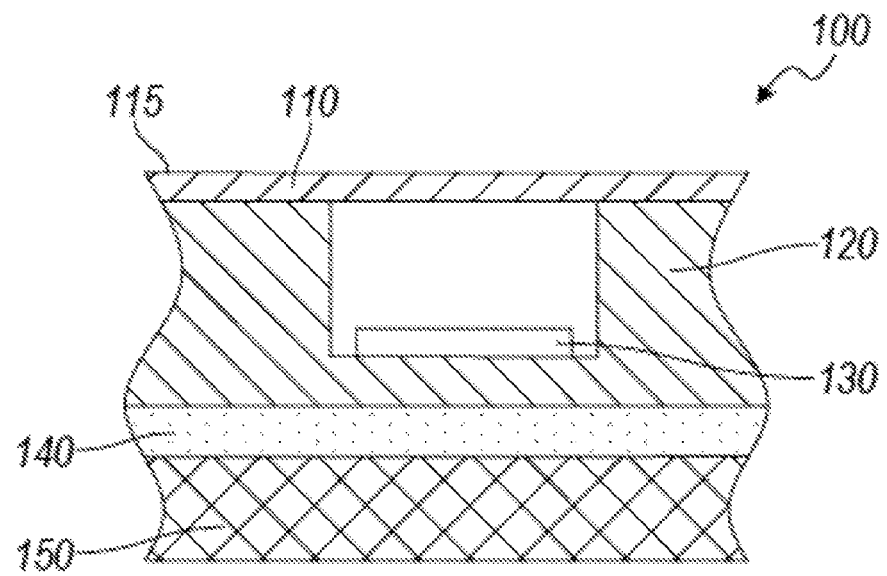
FIGS. 7a and 7b are cross-sectional views of the layer, the substrate, the cavity, the touch sensor, the display, and a displacement device that modifies the existing fluid in the cavity, with the cavity in a retracted volume setting and an expanded volume setting, respectively.
Figure 7B:
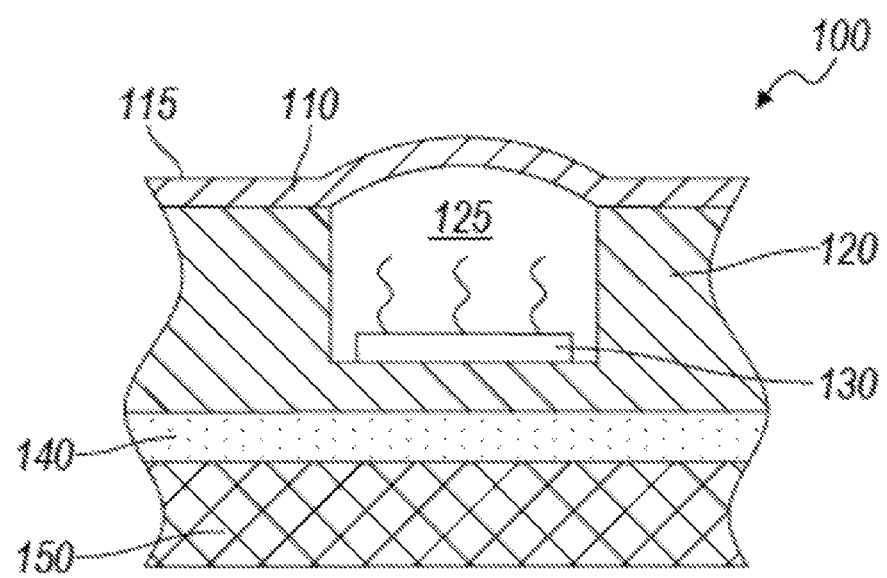

Modifying the existing fluid in the cavity 125 may be accomplished in several ways. In a first example, as shown in FIGS. 7a and 7b, the fluid may be an expandable fluid and the displacement device 130 may include a heating element that heats the expandable fluid, thereby expanding the volume of the existing fluid in the cavity 125 (according to the ideal gas law, PV=nRT). The heating element, which may be located within or adjacent the cavity 125, is preferably a resistive heater (made of a material such as TaN or Nichrome). In a second example, the fluid may include an expandable substance, such as plastic expandable microspheres. In a third example, the fluid may include paraffin. While these are three examples, the displacement device 130 can be any other suitable device or method that ultimately expands the cavity 125 from the retracted volume setting to the extended volume setting by modifying the existing fluid in the cavity 125.

Figure 8:
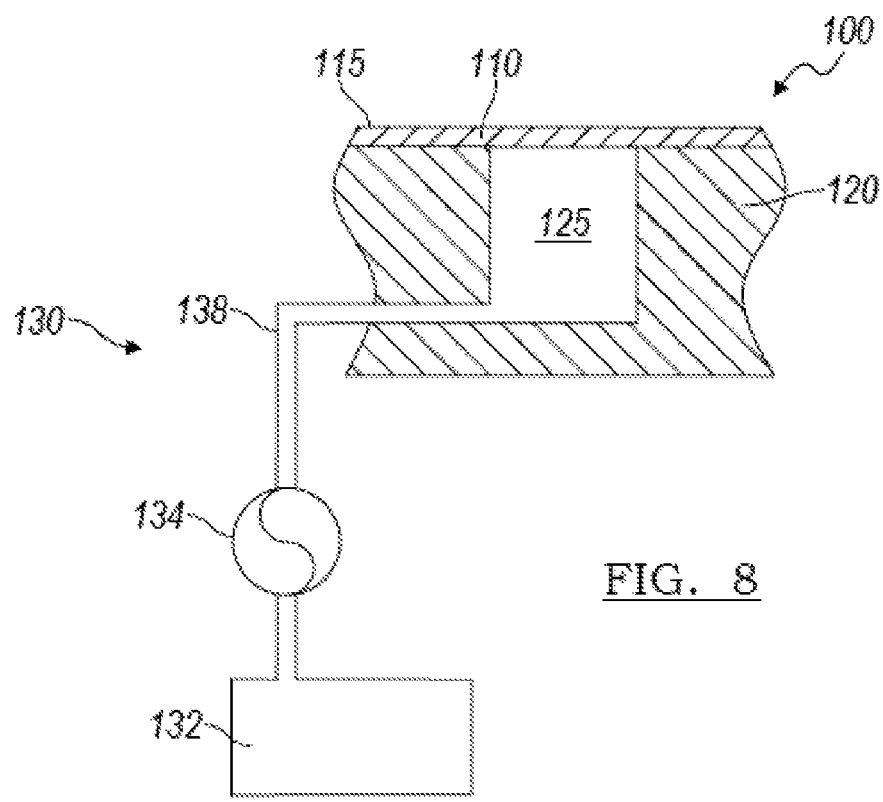
FIG. 8 is a schematic view of the layer, the substrate, the cavity, the touch sensor, the display, and a displacement device of a first example that displaces additional fluid into the cavity.
Figure 9:
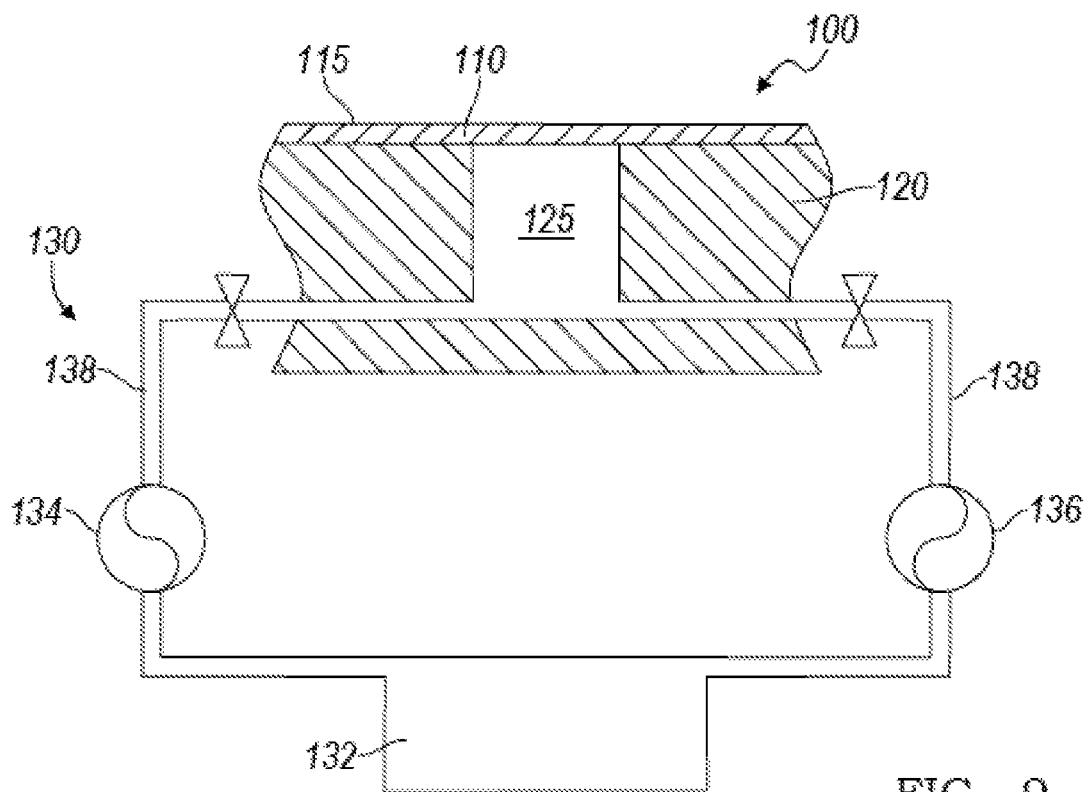
FIG. 9 is a schematic view of the layer, the substrate, the cavity, the touch sensor, the display, and a displacement device of a second example that displaces additional fluid into the cavity.
Figure 10A:
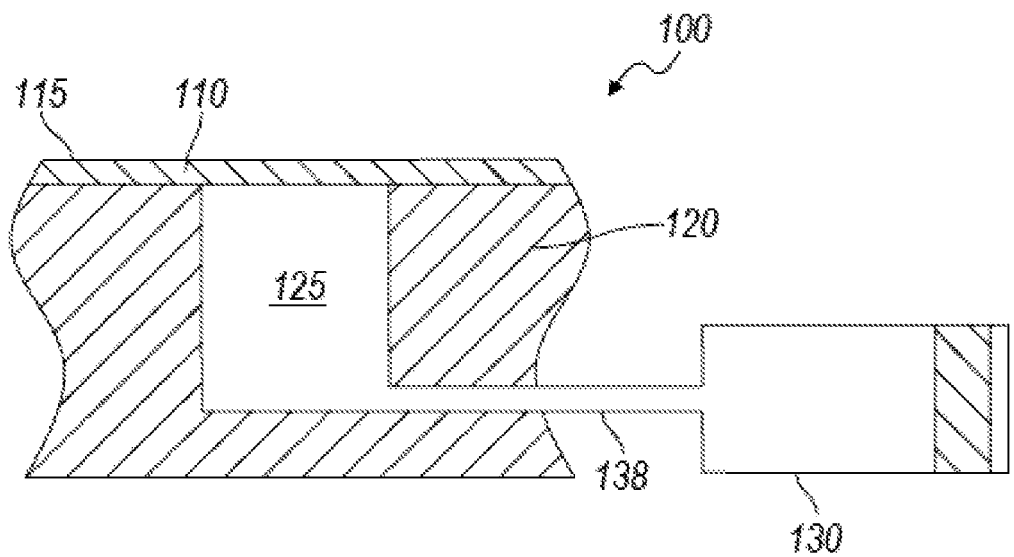
FIGS. 10a and 10b are schematic views of the layer, the substrate, the cavity, the touch sensor, the display, and a displacement device of a third example that displaces additional fluid into and out of the cavity, with the cavity in a retracted volume setting and an expanded volume setting, respectively.
Figure 10B:
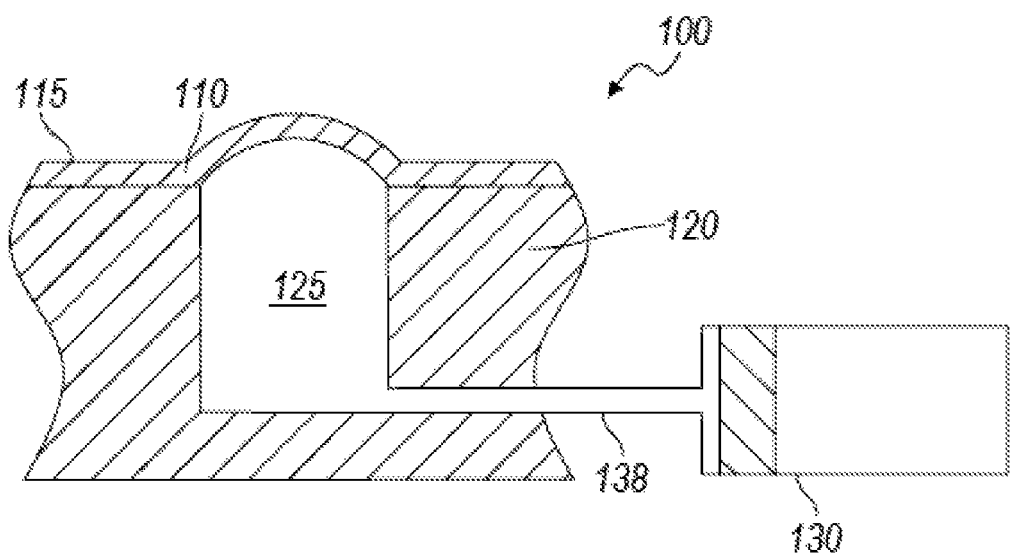

Adding and removing fluid to and from the cavity 125 may also be accomplished in several ways. In a first example, as shown in FIG. 8, the displacement device 130 includes a reservoir 132 to hold additional fluid and a pump 134 to displace fluid from the reservoir 132 to the cavity 125. The reservoir 132 is preferably remote from the cavity 125 (and connected by a channel 138 or other suitable device), but may alternatively be located adjacent the cavity 125 and connected directly to the cavity 125. A portion of the channel 138 is preferably a micro-fluidic channel (having cross-section dimensions in the range of 1 micrometer to 1000 micrometers), but depending on the size and costs constraints of the user interface system 100, the channel 138 may have any suitable dimensions. The pump 134 is preferably a micro-pump (such as pump #MDP2205 from ThinXXs Microtechnology AG of Zweibrucken, Germany or pump #mp5 from Bartels Mikrotechnik GmbH of Dortmund, Germany), but may be any suitable device to pump fluid from one location to another. The pump 134 is preferably located at a distance from the cavity 125, and is preferably connected to the cavity 125 by a channel 138. To extend the cavity 125 from a retracted volume setting to the extended volume setting, the pump 134 displaces fluid from a reservoir 132, through the channel 138, and into the cavity 125. To retract the cavity 125 from the extended volume setting to the retracted volume setting, the pump 134 preferably "vents" or pumps in a reverse direction from the cavity 125 to the reservoir 132. In a second example, as shown in FIG. 9, the displacement device 130 includes a reservoir 132 to hold additional fluid, a first pump 134 to displace fluid from the reservoir 132 to the cavity 125, a second pump 136 to displace fluid from the cavity 125 to the reservoir 132, a first valve located between the first pump 134 and the cavity 125, and a second valve located between the cavity 125 and the second pump 136. To extend the cavity 125 from the retracted volume setting to the extended volume setting, the first valve is opened, the second valve is closed, and the first pump 134 displaces fluid from the reservoir 132, through the channel 138, and into the cavity 125. To retract the cavity 125 from the extended position to the retracted position, the first valve is closed, the second valve is opened, and the second pump 136 displaces fluid from the cavity 125, through the channel 138, and into the reservoir 132. In other respects, the second example is similar to the first example above. The user interface system 100 may omit the second pump 136 and simply retract the cavity 125 from the extended volume setting to the retracted volume setting by opening the second valve and allowing the cavity 125 to vent or "drain" into the reservoir 132 (potentially assisted by the elasticity of the layer no returning to an undeformed state). In a third example, as shown in FIGS. 10a and 10b, the displacement device 130 includes an actuator, such as a linear actuator, that displaces fluid into and out of the cavity 125. To extend the cavity 125 from a retracted volume setting to the extended volume setting, as shown in FIG. 10a, the linear actuator displaces fluid through the channel 138 and into the cavity 125. To retract the cavity 125 from the extended volume setting to the retracted volume setting, as shown in FIG. 10b, the linear actuator draws fluid in a reverse direction from the cavity 125 to the reservoir 132. In other respects, the third example is similar to the second example above. While these are three examples, the displacement device 130 can be any other suitable device or method that ultimately expands the cavity 125 from the retracted volume setting to the extended volume setting by adding and removing fluid to and from the cavity 125.

Although the cause of the deformation of a particular region of the surface 115 has been described as a modification of the volume of the fluid in the cavity 125, it is possible to describe the cause of the deformation as an increase in the pressure below the surface 115 relative to the pressure above the surface 115. When used with a mobile phone device, an increase of approximately 0.1-10.0 psi between the pressure below the layer 110 relative to the pressure above the layer 110, is preferably enough to deform a particular region of the surface 115. When used with this or other applications, however, the modification of the pressure may be increased (or possibly decreased) by any suitable amount.

Figure 11:
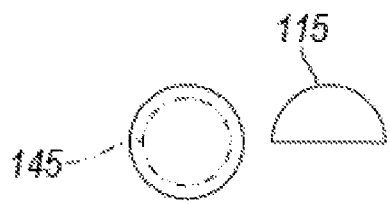
FIGS. 11, 12, 13, 14, and 15 are top and side views of a button deformation, a slider deformation, a slider ring deformation, a guide deformation, and a pointing stick deformation, respectively.
Figure 12:
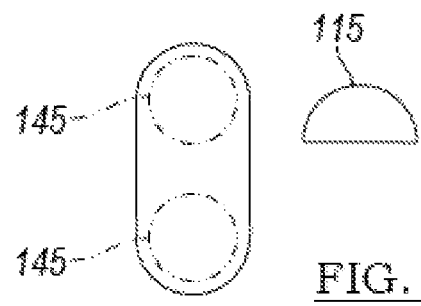
Figure 13:
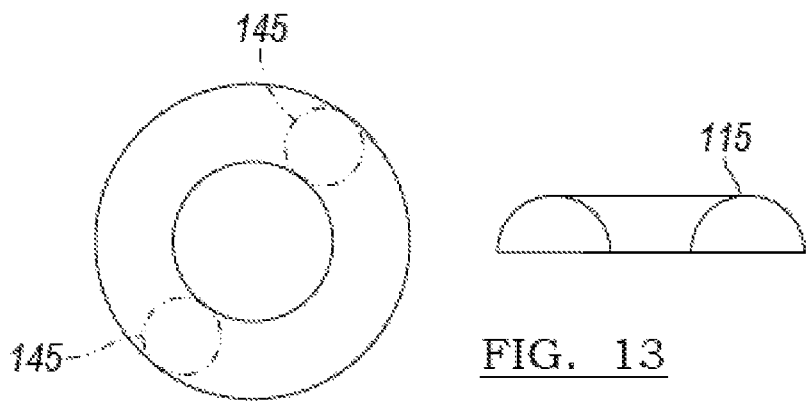
Figure 14:
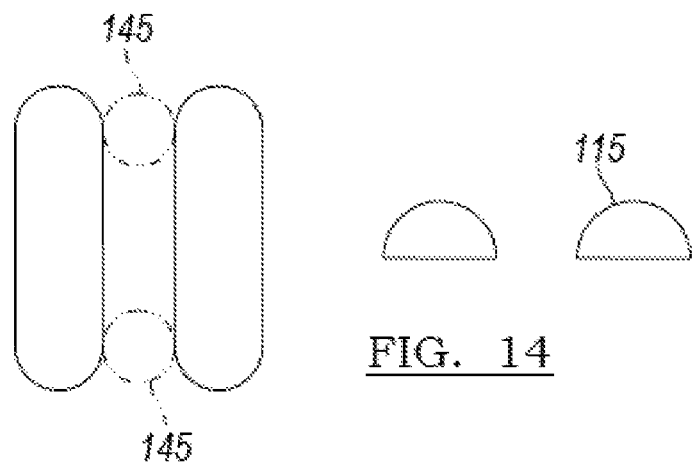
Figure 15:
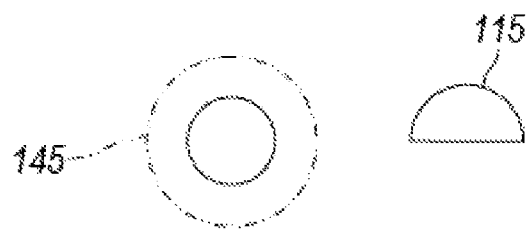

The deformation of the surface 115 functions to provide a tactile feedback that signals the location of the particular region of the surface 115. When used in conjunction with an input graphic on the display 150, the deformation of the surface 115 preferably signals the location of an input on the touch sensor 140. The deformation preferably acts as (1) a button that can be pressed by the user and that signals the location of a single input on the touch sensor 140 under the button, (2) a slider that can be pressed by the user and that signals the location of multiple inputs on the touch sensor 140 under the slider, (3) a guide that signals the location of multiple inputs on the touch sensor 140 adjacent the guide, and (4) a pointing stick that signals the location of multiple inputs on the touch sensor 140 under and adjacent the pointing stick. The deformation may, however, act as any other suitable device or method that signals the location of a particular region of the surface 115. The button, as shown in FIG. 11, preferably has a dome-like shape, but may alternatively have a cylindrical-like shape (with a flat top surface), a pyramid-like shape, a cube-like shape (with a flat top), or any other suitable button shape. The touch sensor 140 preferably recognizes any user touch 145 into the button as a user input. The slider, as shown in FIGS. 12 and 13, preferably has a ridge like shape (shown in FIG. 12), but may alternatively have a ring like shape (shown in FIG. 13), a plus-like shape, or any other suitable slider shape. The touch sensor 140 preferably recognizes user touches 145 at different locations into the slider and distinguishes these user touches as different user inputs. As an example, the slider with the ring like shape may act like the "click wheel" of the Apple iPod (second generation). The guide, as shown in FIG. 14, preferably has a double ridge shape or a double ring shape. Unlike the button and the slider, which are meant to be pressed by the user, the guide is meant to signal the location next to the area meant to be pressed by the user. The touch sensor 140 preferably recognizes user touches 145 at different locations between the two ridges and distinguishes these user touches as different user inputs. In another version, the guide may omit the second ridge. The pointing stick, like the button, preferably has a dome-like shape, as shown in FIG. 15, but may alternatively have a cylindrical-like shape (with a flat top surface), a pyramid-like shape, a cube-like shape (with a flat top), or any other suitable button shape. The pointing stick is meant to signal the location under and adjacent the area meant to be pressed by the user. The touch sensor 140 preferably recognizes user touches 145 at different locations under and around the pointing stick and distinguishes these user touches as different user inputs. As an example, the point stick may act like the pointing stick trademarked by IBM as the TRACKPOINT and by Synaptics as the TOUCHSTYK (which are both informally known as the "nipple").

1C. The Touch Sensor and the Display

The touch sensor 140 of the preferred embodiments functions to sense a user touch proximate the particular region of the surface 115. The touch sensor 140 is preferably located under the substrate 120 (as shown in FIGS. 3a and 3b), but may alternatively be located above the substrate 120 (as shown in FIGS. 4a and 4b). If located above the substrate 120, in addition to sensing a user touch, the touch sensor 140 also functions to deform upon an expansion of the cavity 125 and therefore the touch sensor 140 preferably has elastic properties similar to the layer 110. As a variation of this version, the touch sensor 140 may act as the layer 110 to partially define the cavity 125. The touch sensor 140 preferably senses a user touch in a continuous or multiple step manner. For example, the touch sensor 140 preferably distinguishes a resting user touch (that does not significantly modify the deformation of the surface 115), a gentle user touch (that partially pushes the surface 115 back to the normal, unexpanded plane of the surface 115), and a hard user touch (that completely pushes the surface 115 back to the normal, unexpanded plane of the surface 115). In other words, the touch sensor 140 preferably senses different "heights" of the deformation. The touch sensor 140 may, however, simply sense a user touch in a binary manner ("on" or "off"). In one example, the touch sensor 140 is preferably a conventional capacitance-based touch sensor, such as the touch panel sold by Synaptics under the trademark CLEARPAD, but may be any suitable device that senses a user touch. The capacitance-based touch sensor preferably senses a user touch based on the change in capacitance between two locations within or near the cavity 125. In another example, the touch sensor 140 is a pressure sensor either located in or coupled to the cavity 125. The pressure sensor preferably senses a user touch based on a change in the pressure within the cavity 125 caused by a user touch on the deformation of the surface 115. In yet another example, the touch sensor 140 is integrated with the displacement device 130 to sense either a fluid displacement or a pressure change caused by a user touch on the deformation of the surface 115. While these are three examples, the touch sensor 140 can be any other suitable device or method that senses a user touch proximate the deformation of the surface 115.

The display 150 of the preferred embodiments functions to interface with a user in a visual manner. The display 150 is preferably a conventional liquid crystal display (LCD), but may alternatively any suitable device that displays an output. In one version, as shown in FIGS. 3a and 3b, the display 150 is located under the substrate 120. In another version, the touch sensor 140 and the display 150 may be integrated as a single structure that both senses a user input and displays an output. For example, an LCD with embedded optical sensors both touch screen and scanner functions was announced in a 2007 press release by Sharp Electronics of Japan. This combined touch sensor/display—if flexible—may be located above the substrate 120, and—if not flexible—may be located below the substrate 120. If the display 150 is located below the substrate 120 and the fluid, then the substrate 120 and the fluid are preferably transparent and are preferably chosen to have substantially similar (if not identical) refractive indexes. An example of a substrate 120 and fluid that have substantially similar refractive indexes include: PMMA (which has an index of refraction of 1.489) and the Cargille Laboratories Series A fluids (which cover the range of 1.460-1.640) or a mixture of Diethyl Phthalate and water. When used in mobile phones, "substantially similar" in this context preferably means +/−0.1 relative to each other. When used in this and other applications, "substantially similar" may alternatively mean similar enough to prevent viewing distortions of the display 150. The display 150 preferably outputs several different visual outputs. One of the outputs is preferably an input graphic that is aligned with the particular region of the surface 115 that can be deformed by the cavity 125 in the extended volume setting. Examples of suitable input graphics include individual letters of a QWERTY keyboard, individual numbers in a dial pad, and different locations on a map.

1D. The Processor

Figure 16:
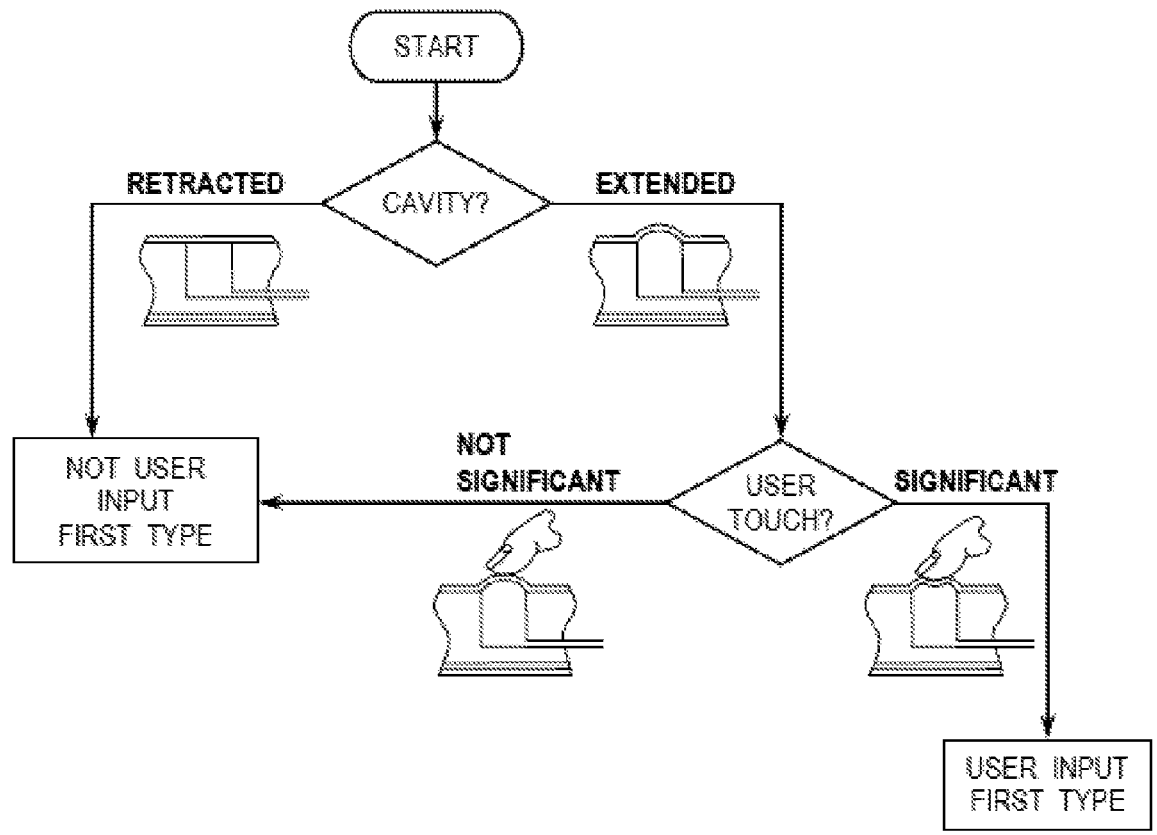
FIG. 16 is a flow chart of the different operation modes of the preferred embodiments.

The user interface system 100 of the preferred embodiment also includes a processor, which is coupled to the displacement device 130 and to the touch sensor 140. As shown in FIG. 16, the processor functions to operate the user interface system 100 in an Extended Cavity Mode and a Retracted Cavity Mode. In the Extended Cavity Mode, if the particular region of the surface 115 is deformed, then a user touch that further significantly deforms the particular region of the surface 115 is preferably recognized as a user input of a first type. A user touch that does not significantly deform the particular region of the surface 115, such as the touch of a user resting their fingers on the deformation, is preferably not recognized as a user input of the first type (and is preferably ignored). In this manner, the deformation of the surface 115 additionally functions to distance the user touch from the touch sensor 140 and to allow the user to rest their fingers on the deformation (the location of an input) without actuating the input. The question of whether a user has significantly or not significantly deformed the particular region of the surface 115 may be set or modified by the manufacturer, by the processor, or by the user. In the Retracted Cavity Mode, if the particular region of the surface 115 is not deformed, then a user touch at the particular region in the surface 115 is preferably not recognized as a user input of the first type, but rather is recognized as a user input of a second type that is distinguishable from a user input of the first type.

The processor may also function to automatically alter the settings of the user interface system 100. In a first example, in extremely low temperatures, it may be impossible for the displacement device 130 to modify the volume of the fluid to expand the cavity 125 and deform the surface 115. The processor may be coupled to a temperature sensor and may disable the displacement device 130 under such conditions. In a second example, in high altitude conditions (or in an airplane with reduced air pressure), it may be impossible for the displacement device 130 to modify the volume of the fluid to retract the cavity 125. The processor may be coupled to a pressure sensor and may either disable the displacement device 130 (or close particular valves), or may simply adjust the volume of the fluid that is modified under such conditions.

As shown in FIG. 17, the processor may also be coupled to the display 150 such that different input graphics may be displayed under the same deformation of the surface 115, and different inputs may be recognized. As an example, when the cavity 125 is in the extended volume setting, the display 150 may include an input graphic of a first type (such as a letter) and the user input on the deformation would be of a first type (such as a letter), and the display 150 may include an input graphic of a second type (such as a number) and the user input on the deformation would be of a second type (such as a number). When the cavity 125 is in the retracted volume setting, the display 150 may further include an input graphic of a third type (such as an "enter" or "accept" input), and the user input on the touch sensor 140 would be of a third type (such as an "enter" or "accept" input).

The processor may also function to alter the output of the display 150 to correct or adjust for any optical distortion caused by the deformation in the surface 115. It is envisioned that, in certain applications, the size of the deformation may cause a "fish eye" effect when viewing the display 150. The processor, preferably through empirical data, may adjust the output to help correct for this distortion.

The processor preferably includes a separate and remote controller for the displacement device 130, a separate and remote controller for the touch sensor 140, and a separate and remote controller for the display 150. The processor may, however, integrally include a controller for one or more of these elements.

1E. Second Cavity

Figure 18A:
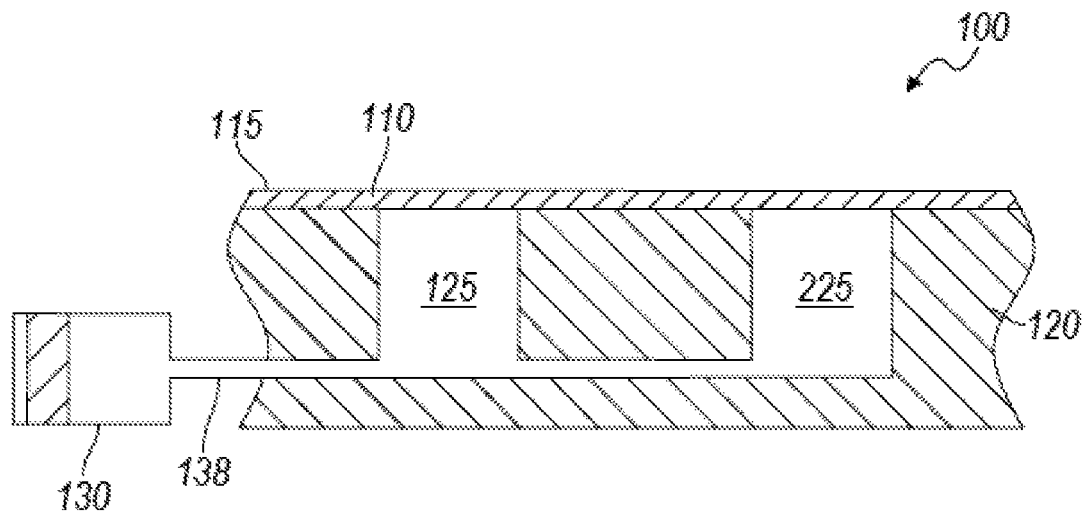
FIGS. 18a and 18b are schematic views of the cavity and the second cavity connected to a single displacement device, with the cavity in a retracted volume setting and an expanded volume setting, respectively.
Figure 18B:
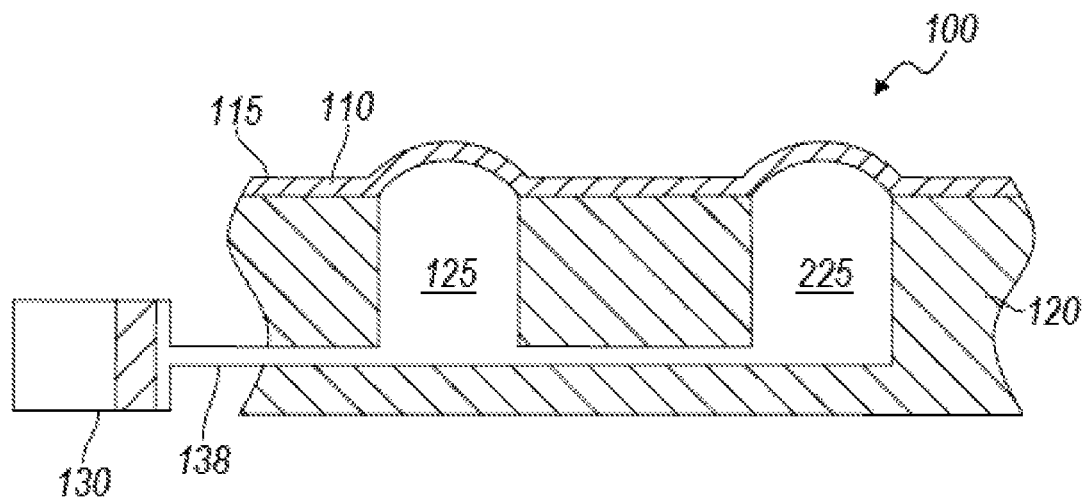
Figure 19A:
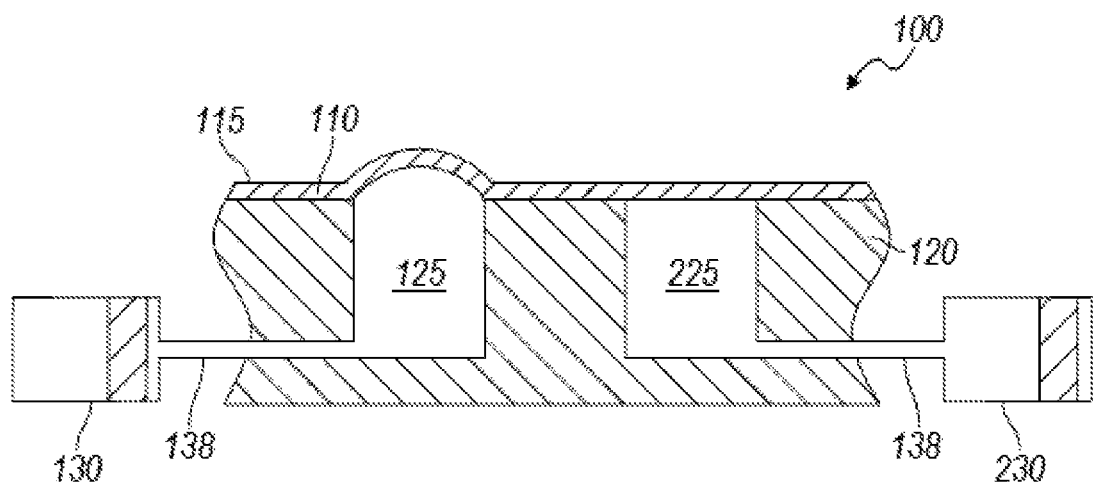
FIGS. 19a and 19b are schematic views of the cavity and the second cavity connected to a separate displacement devices, with the cavity in a retracted volume setting and an expanded volume setting, respectively.
Figure 19B:
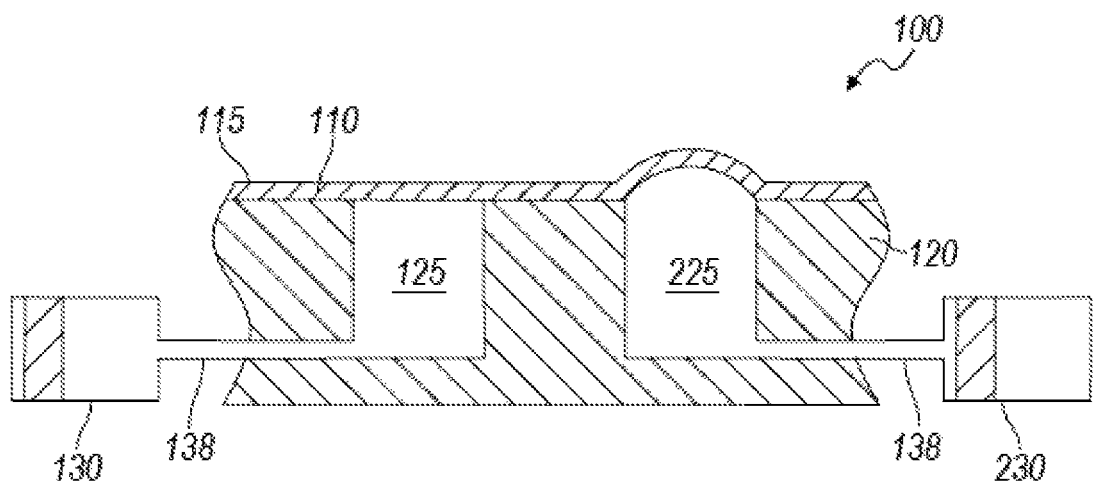
Figure 20A:
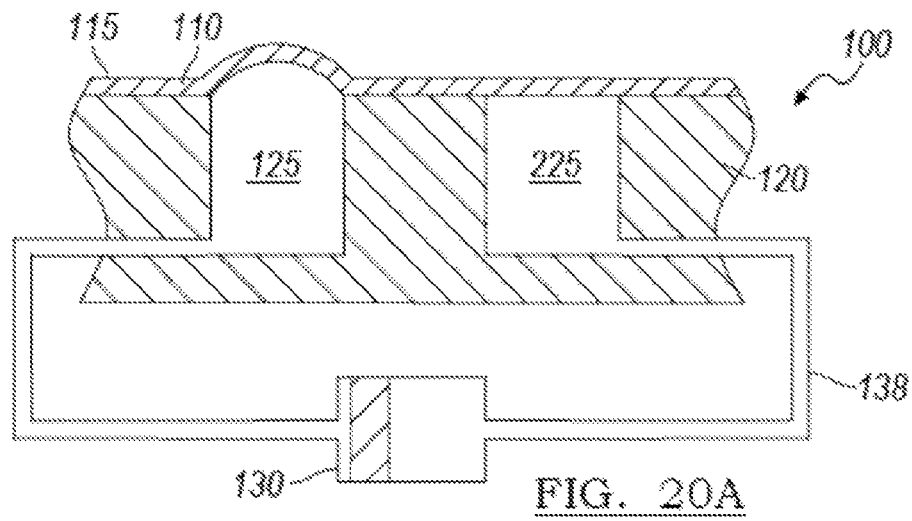
FIGS. 20a, 20b, and 20c are schematic views of the cavity and the second cavity connected to a linear actuator, with the cavity in the expanded volume setting and the second cavity in the retracted volume setting, the cavity and the second cavity in the retracted volume setting, and the cavity in the retracted volume setting and the second cavity in the expanded volume setting, respectively.
Figure 20B:
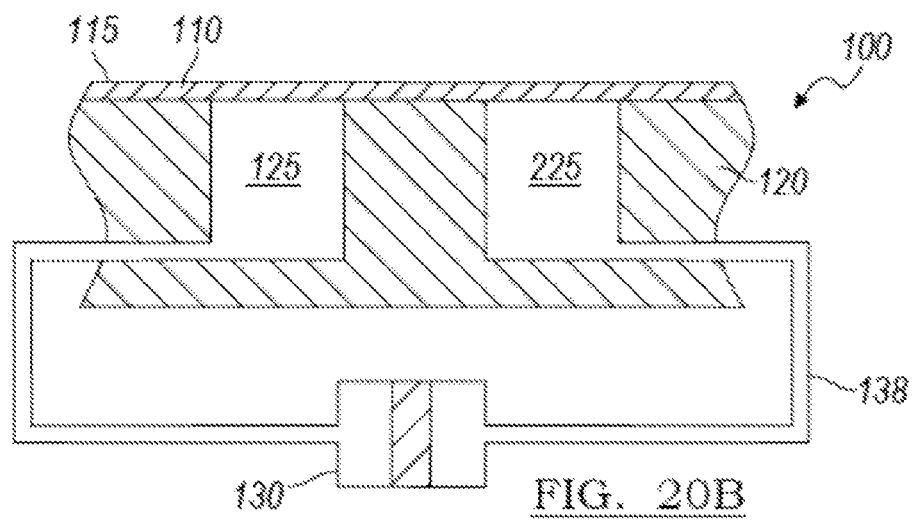
Figure 20C:
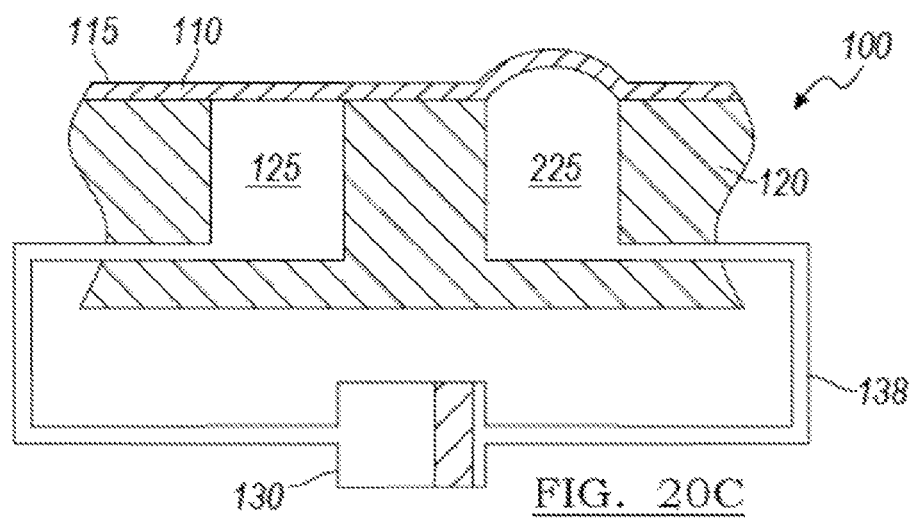
Figure 21A:
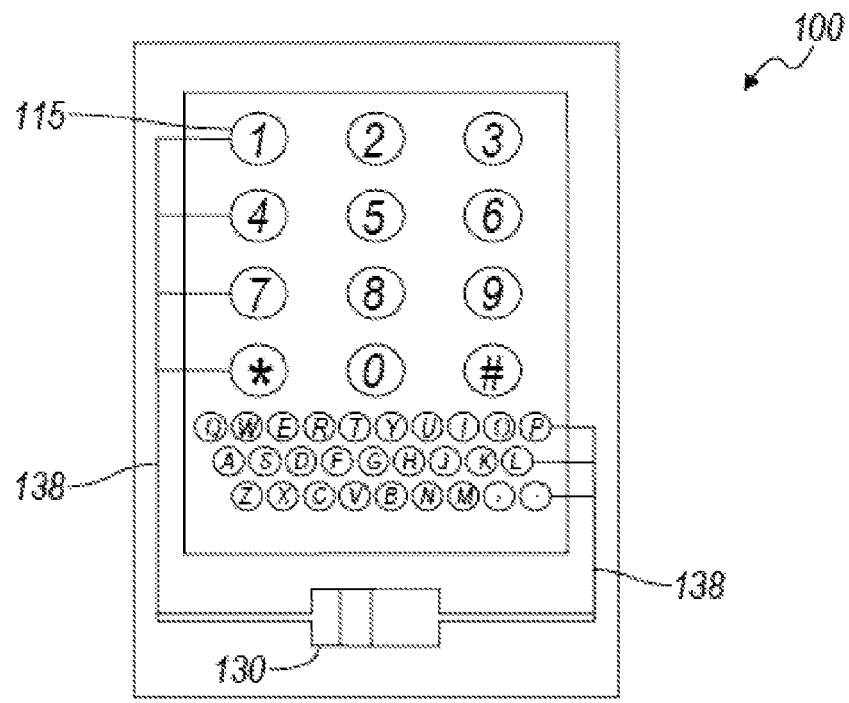
FIG. 21a is a schematic view of a first cavity array arranged in a dial pad and a second cavity array arranged in a QWERTY keyboard on the same device.
Figures 21B, 21C:
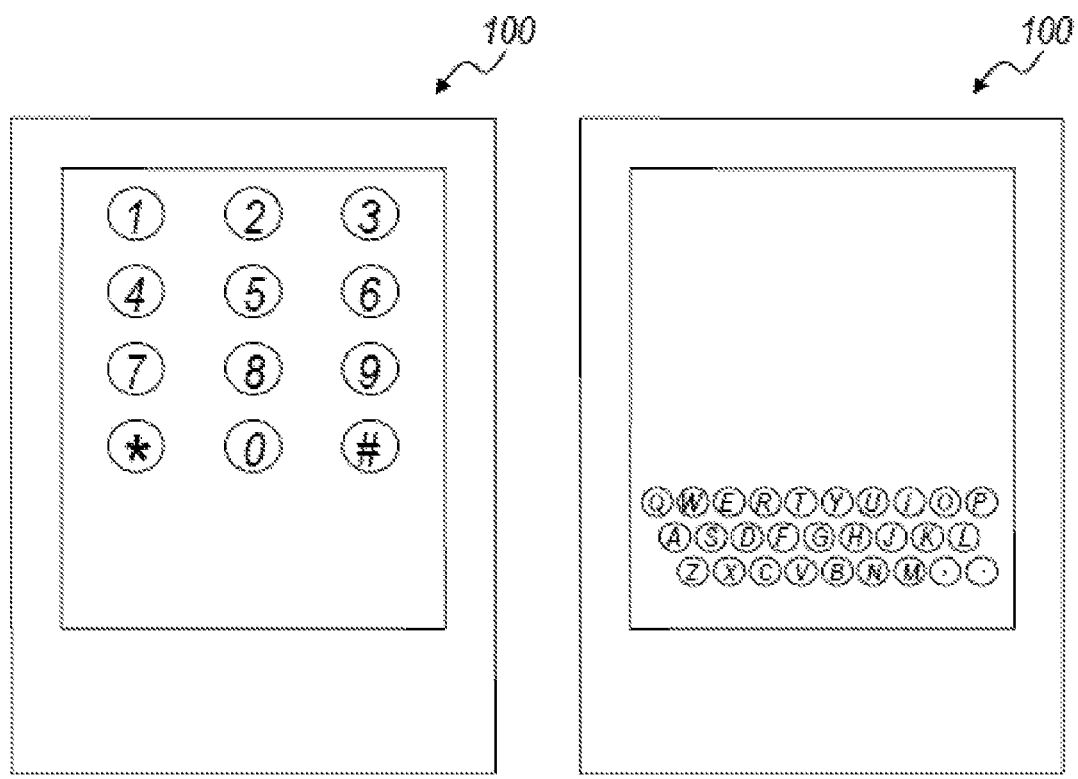
FIGS. 21b and 21c are schematic views of the display of a dial pad aligned with the first cavity array and a QWERTY keyboard aligned with the second cavity array, respectively.

As shown in FIGS. 1 and 2, the user interface system 100 of the preferred embodiment also includes a second cavity 225. The additional cavities, except as detailed below, are preferably identical to the cavity 125. In one version, as shown in FIGS. 18a and 18b, the displacement device 130 is connected to both the cavity 125 and the second cavity 225 and is adapted to expand the cavity 125 and the second cavity 225 together, acting together as an array, thereby deforming more than one region of the surface 115 at the same time. In a second version, the user interface system 100 includes a valve located between the displacement device 130 and the cavity 125 and another valve located between the displacement device 130 and the second cavity 225 to selectively control the fluid flow into the cavity 125 and into the second cavity 225, respectively. In a third version, as shown in FIGS. 19a and 19b, the user interface system 100 includes a second displacement device 230 connected to the second cavity 225, which functions to expand the second cavity 225 and thereby deforming a second region of the surface 115. The second displacement device 230 is otherwise similar or identical to the displacement device 130. By separately controlling the displacement device 130 and the second displacement device 230, the cavity 125 and the second cavity 225 may be expanded independently. In a fourth version, as shown in FIGS. 20a, 20b, and 20c, the displacement device 130 is a linear actuator that can either expand the cavity 125 and retract the second cavity 225 (shown in FIG. 20a), retract the cavity 125 and the second cavity 225 (shown in FIG. 20b), or retract the cavity 125 and expand the second cavity 225 (shown in FIG. 20c). This arrangement may be particularly useful in large arrays of cavities, as shown in FIG. 21a, where the cavities aligned with a dial pad can be expanded (as shown in FIG. 21b) or the cavities aligned with a QWERTY keyboard can be expanded (as shown in FIG. 21c).

1F. Power Source

The user interface system 100 of the preferred embodiments also includes either a power source or a power harnessing device, which both function to power the displacement device 130 (and possibly other elements of the user interface system, such as the touch sensor 140 and/or the display 150). The power source is preferably a conventional battery, but may be any suitable device or method that provides power to the displacement device 130. The power-harnessing device, which is preferably integrated into the hinge of a flip phone or laptop, functions to harness a portion of the energy involved in the normal use of the electronic device (such as the opening of a flip phone or the screen on a laptop). The power-harnessing device may alternatively be integrated in a separate mechanical input device (such as a button on the side of a mobile phone, or a "self-winding" device found in automatic watches) or any other suitable device or method to harness a portion of the energy involved in the normal use of the electronic device.

1G. Alternative Embodiments

The user interface system of an alternative embodiment of the invention omits the display 150. The user interface system of the alternative embodiment is otherwise similar or identical to the user interface system 100 of the preferred embodiment. The user interface system of the alternative embodiment can be incorporated into electronic devices that do not typically include a display, such as peripheral for an electronic device. Suitable peripherals include a mouse, a trackpad, a keyboard, and a remote control. These peripherals are often used only by touch, and not by sight. The user interface system may, however, be incorporated in any suitable device.

2. Second Preferred Embodiment

As shown in FIG. 6B, the user interface 100 of the second preferred embodiment includes: a substrate 120, a tactile layer 110, a support member 160, a displacement device 130, and a sensor 140. The substrate 120 preferably defines a fluid channel 138 connected to a cavity 125. The tactile layer 110 preferably includes a tactile surface 115, wherein a deformable region 112 of the tactile layer 110 cooperates with the substrate 120 to define the cavity 125, and an undeformable region 114 of the tactile layer 110 is coupled to the substrate 120 substantially proximal a perimeter of the cavity. The support member 160 is preferably arranged within the cavity 125 and is disconnected from the deformable region 112, and the support member 160 is configured to support the deformable region 112 against substantial inward deformation. The displacement device 130 is coupled to the fluid channel 138 and is configured to displace fluid into the cavity 125 to transition the deformable region 112 from a retracted setting to an expanded setting. The expanded setting is tactilely distinguishable from the retracted setting at the tactile surface 115. The sensor 140 is coupled to the substrate 120 and configured to detect an input at the tactile surface 115.

The user interface 100 of the second preferred embodiment functions to selectively provided tactile guidance at the tactile surface 115. The tactile layer 110 selectively transitions between the retracted and expanded settings to modify a form of the tactile surface 115 at the deformable region 112. The tactile surface 115 at the deformable region 112 can be flush or in plane with the undeformable region 114 in the retracted setting and offset from or elevated above the undeformable region 114 in the expanded setting. Alternatively, the tactile surface 115 at the deformable region 112 can be flush or in plane with the undeformable region 114 in the expanded setting and offset from or sunk below the undeformable region 114 in the retracted setting. Furthermore, the tactile surface 115 at the deformable region 112 can be offset from the undeformable region 114 by a first distance in the retracted setting and offset from the undeformable region 114 by a second distance in the expanded setting. However, the position of the deformable region 112 relative to the undeformable region 114 in either setting can be of any other degree or formula. The deformable region 112 preferably defines a raised button at the tactile surface 115 in the expanded setting, through the particular region can define any of a ridge, a ring, a slider, a joystick or any other form to define an input region as shown in FIGS. 11 through 15. Alternatively, the deformable region 112 can define a guide or ridge adjacent an input region, wherein the deformable region 112 provides tactile guidance to a user as the user generates the input at the input region.

The user interface 100 is preferably implemented in an electronic device having a digital display 150, wherein an image generated by the display 150 is projected through the (translucent) substrate 120 and tactile layer 110 to the user, and wherein the tactile layer 110 at the deformable region 112 provides tactile guidance aligned with the image. For example, the image can be of a letter of a QWERTY keyboard displayed on the digital display 150, and the image is aligned with the deformable region 112 such that the deformable region 112 tactilely defines the input region associated with the letter of the image and such that the user can tactilely distinguish between the input region associated with the letter and any other input region associated with any other letter or input. The electronic device can therefore be incorporated into any of: an automotive console, a desktop computer, a laptop computer, a tablet computer, a television, a radio, a desk phone, a mobile phone, a smart phone, a PDA, a personal navigation device, a personal media player, a camera, a watch, or any other electronic device incorporating a digital display. Alternatively, the user interface 100 can be implemented in an electronic device or any other device not incorporating a display. For example, the user interface 100 can be incorporated into any of the following to provide tactile guidance on or proximal an input region: a roll-out keyboard; a control unit for a machine tool (e.g., Haas VF-o CNC); a keypad lock; a vending machine; a steering wheel; a gaming controller; a television remote control; an elevator control pad, a computer mouse or touchpad; or any other suitable device. However, the user interface 100 can interface with an electronic or other device in any other way and provide any other suitable guidance to the user.

2A. Substrate

The substrate 120 of the second preferred embodiment functions to cooperate with the tactile layer 110 to define the cavity 125 and to define the fluid channel 138 connected to the cavity 125. In one variation shown in FIG. 6B, the substrate 120 defines a recess, and the tactile layer 110 is substantially uniform in thickness and traverses the recess to enclose the cavity 125. In another variation shown in FIG. 22A, the tactile layer 110 defines a recess opposite the tactile surface 115, and the substrate 120 is substantially uniform in thickness and traverses the recess to enclose the cavity 125. However, the substrate 120 and tactile layer 110 can include any other geometry to cooperatively define the cavity 125. The fluid channel 138 is preferably a sunk canal or vein configured to communicate fluid to and from the cavity 125 in a direction substantially parallel to the tactile surface 115. The fluid channel 138 is therefore connected (e.g., fluidly coupled) to the cavity 125. In the variation of the user interface 100 that includes multiple cavities adjacent multiple deformable regions, the fluid channel 138 can also be connected to any one or more additional cavities such that fluid is communicated between the cavity 125 and the any one or more additional cavities. In this variation in which the displacement device 130 is configured to displace fluid toward the cavity 125 to transition the deformable region 112 from the retracted setting to the expanded setting, the cavity 125 and any one or more additional cavities can transition between settings substantially simultaneously given a fluid pressure change in the fluid channel 138 induced by the displacement device 130. The fluid channel 138 can therefore be a singular (e.g., serpentine) channel, a channel tree with multiple branches, as shown in FIG. 1, multiple separate channels at various depths within the substrate 120, or any other number or configuration of channels.

Figure 23A:
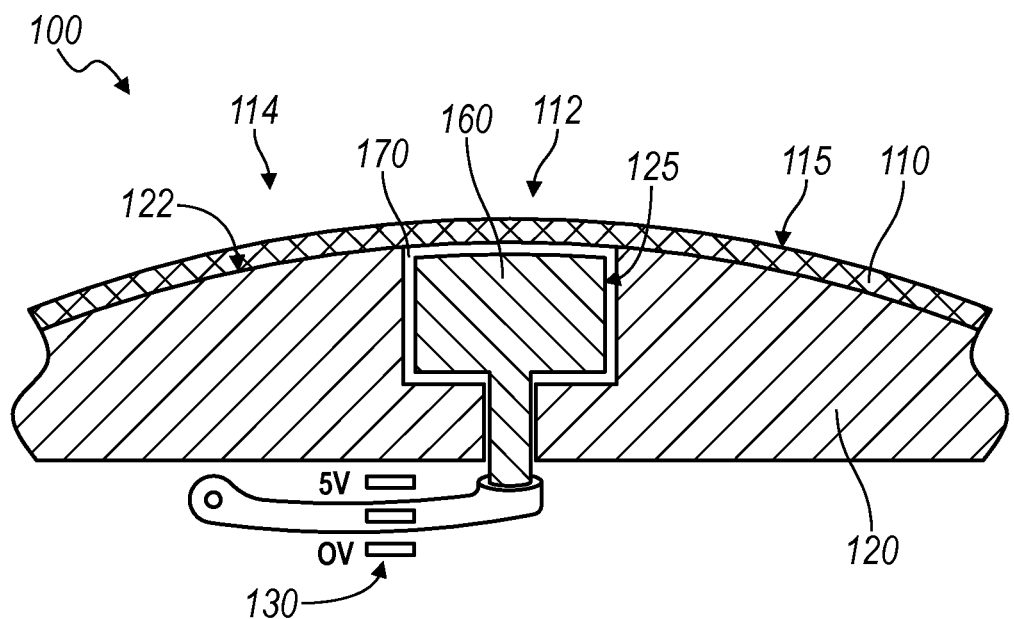
FIGS. 23a and 23b are schematic views of another version the support member in accordance with another preferred embodiment of the present invention.

The substrate 120 is preferably continuous and planar across a portion thereof adjacent the undeformable region 114 of the tactile layer 110 (i.e. an attachment face 122). However, the substrate 120 can also define a surface curved about two or three dimensions, as shown in FIG. 23A. Specifically, the substrate 120 can be linear along two axes of a Cartesian plane, linear along one axis and curvilinear along a second axis of the Cartesian plane, or curvilinear along two axes of the Cartesian plane. Furthermore, the substrate 120 can define various steps or levels across any portion(s) thereof.

The substrate 120 is preferably substantially translucent, and the substrate 120 can be further transparent to allow light (e.g., from a display 150) to pass there through substantially unobstructed. The substrate 120 can be any of glass, an acrylate polymer (e.g., poly(methyl methacrylate)), polycarbonate, or any other suitable material. The substrate 120 also preferably includes a material with a refractive index substantially similar to that of the fluid. (The fluid can be water, alcohol, air, oil, or any other suitable gas, liquid, or other substance that displays fluidic properties) However, the substrate 120 is preferably of a substantially rigid material to provide a backing that does not substantially deform during transitions between the expanded and retracted settings or given an input at the tactile surface 115. The fluid channel 138 and/or the recess of the cavity 125 can be formed in the substrate 120 via conventional machining (e.g., milling, drilling), chemical etching (e.g., bulk micromachining), electrode erosion (e.g., wire EDM), stamping, forming, forging, injection molding, embossing, casting, or any other suitable manufacturing method. The substrate 120 can also include multiple layers stacked and joined to define the fluid channel 138 and/or the recess. The substrate 120 can further cooperate with any other layer, such as a display 150 coupled to the substrate 120 opposite the tactile layer no, to define the fluid channel 138.

2B. Tactile Layer

Figure 22A:
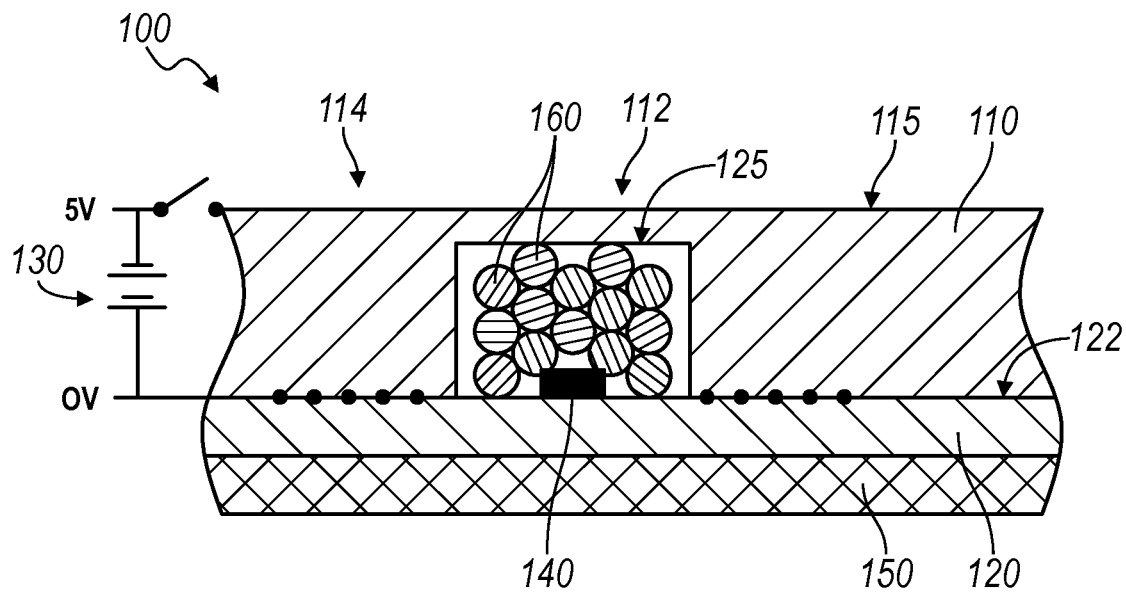
FIGS. 22a and 22b are schematic views of one version of the support in accordance with another preferred embodiment of the present invention.

The tactile layer 110 of the second preferred embodiment includes the deformable region 112 and the undeformable region 114, as shown in FIG. 22A. The undeformable region 114 is coupled to the substrate 120 at an attachment face 122 substantially proximal the perimeter of the cavity 125, which functions to: retain the tactile layer 110 against the substrate 120; to define a perimeter, shape, and/or form of the tactile surface 115 at the deformable region 112 when offset from the undeformable region 114 in either setting; and/or to substantially seal the cavity 125 to prevent leakage of fluid therefrom. The tactile layer 110 can be coupled to the substrate 120 at an attachment point, at a series of attachment points, along an attachment line, or across an attachment area on the attachment face 122. The deformable region 112 can be attached along all or a portion of a perimeter of the cavity 125, within or along a wall of the cavity 125, or substantially offset from the perimeter of the cavity 125. The undeformable region 114 can be glued, bonded (e.g., ultra-sonic, diffusion), mechanically fastened, chemically adhered, or otherwise coupled to the attachment face 122 in any other way. Because the undeformable region 114 is coupled or otherwise attached directly to the substrate 120, the deformable region 112 is preferably retained against substantial deformation. However, because the deformable region 112 is not coupled or otherwise attached directly to the substrate 120, the deformable region 112 is preferably substantially free to deform, such as outwardly to define a button on the tactile surface 115 or inwardly to define a recess or guide for a finger.

The tactile layer 110 is preferably continuous across the deformable and undeformable regions 112, 114 at the tactile surface 115. The tactile layer 110 is also preferably of constant thickness across the deformable and undeformable regions 112, 114, as shown in FIG. 23A. However, the tactile layer 110 can also be of non-uniform thickness across deformable and undeformable regions 112, 114, such as in the variation in which the tactile layer 110 defines the recess of the cavity 125 and as shown in FIG. 22A. Alternatively, the tactile layer 110 can define a step between the deformable and undeformable regions 112, 114, or the deformable region 112 can be of non-uniform thickness. For example, the deformable region 112 can be thicker toward the center of the cavity 125 and thinner toward the perimeter of the cavity 125 to produce a planar tactile surface 115 continuous with the tactile surface 115 of the undeformable region 114 in the retracted setting and a substantially planar tactile surface 115 elevated above the tactile surface 115 of the undeformable region 114 in the expanded setting.

The tactile layer 110 is preferably substantially translucent, and the tactile layer 110 can be further transparent to allow light (e.g., from a display iso) to pass there through substantially uninhibited. The tactile layer 110 can be any of an acrylate polymer (e.g., poly(methyl methacrylate)), polycarbonate, a silicon-based elastomer (e.g., poly-dimethylsiloxane (PDMS), RTV Silicone), or any other suitable material or combination thereof. The tactile layer 110 can include one or more layers of one or more materials, and/or the tactile layer 110 can include a deformable region 112 of one material (or set of materials) and an undeformable region 114 of a different material (or set of different materials). However, the deformable region 112 of the tactile layer 110 is preferably substantially flexible (e.g., elastic) to permit repeated transitions between the expanded and retracted settings. The deformable region 112 therefore preferably includes a material that does not plastically deform within the range of deformations of the deformable region 112 during normal use. Specifically, the deformable region 112 is preferably flexible and/or elastic enough to deform into the tactilely distinguishable formation in one setting, then return to the undeformed formation in the other setting without substantially permanent (i.e. plastic) deformation.

2C. Support Member

The support member 160 of the second preferred embodiment functions to support the deformable region 112 against substantial inward deformation. The support member 160 is arranged within the cavity 125 and is disconnected from the deformable region 112 of the tactile layer 110. The support member 160 preferably further supports the deformable region 112 to reduce or substantially eliminate tactile inconsistencies (e.g., divots) on the tactile surface 115 in at least one setting, which may yield the benefit of providing a substantially smooth tactile surface in at least one setting.

Figure 24:
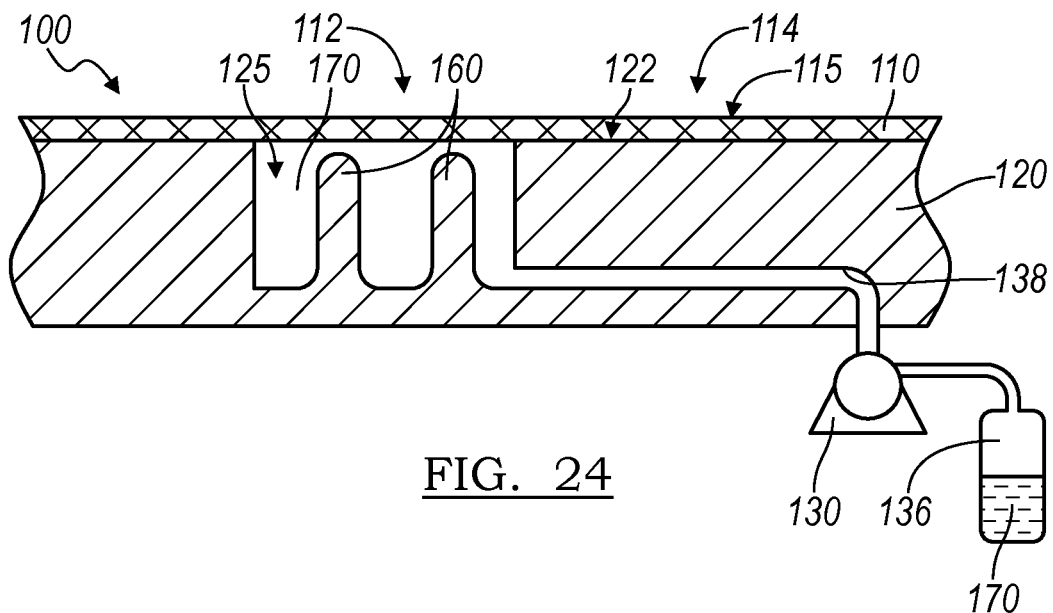
FIG. 24 is a schematic view of another version of the support member in accordance with another preferred embodiment of the present invention.

In a first variation, the support member 160 is attached to the substrate 120. As shown in FIG. 24, the support member 160 can extend into the cavity 125 toward the deformable region to resist inward deformation of the tactile layer 110 into the cavity 125. As shown in FIG. 6B, the support member 160 can define a surface continuous with the attachment face 122 of the substrate 120 adjacent the tactile layer 110, wherein the support member 160 defines at least one fluid conduit (i.e. a second fluid channel) configured to communicate fluid toward the deformable region 112. In this first variation, the support member 160 can include a column extending into the cavity 125 toward the deformable region 112 (FIG. 24), a lattice structure extending in to the cavity 125 adjacent the deformable region 112 (FIG. 6B), or any other suitable structure extending into the cavity 125 in any other way.

In a second variation, the support member 160 is disconnected (i.e., distinct and discreet) from both the substrate 120 and the tactile layer 110. As shown in FIG. 22A, the support member 160 can be one or more beads that substantially fill the cavity 125 and support the deformable region 112 of the tactile layer 110 by transferring a force on the tactile surface 115 through adjacent beads and into the bottom of the cavity 125 (defined by the substrate 120). Each bead can float within the cavity 125, thus permitting beads to move relative to one another when the volume of the cavity 125 increases in the expanded setting. Alternatively, the beads can be locked in place within the cavity 125, such as by press fitting the beads therein or by retaining the beads therein with a retention feature such as a rim or lip. The beads are preferably spherical in cross section but can alternatively be cylindrical, square or otherwise rectilinear, tetrahedral, amoebic, or of any other suitable form. The beads are preferably suitably sized for the cavity 125 such that a bead cannot be trapped with any portion thereof extending above the attachment face 122 and thus obstructing the continuity of the tactile surface 115 in a setting not configured for tactile guidance. For example, the cavity 125 can be 2 mm in diameter and 1 mm in depth, wherein a plurality of beads fills the cavity 125 and supports the deformable region 112 against substantially inward deformation, each bead being approximately 0.5 mm in diameter. Furthermore, interstitials or gaps between the bead(s) and/or a wall of the cavity 125 preferably define a fluid path within the cavity 125, wherein fluid is communicated from one side of the cavity 125, through the interstitials, to the deformable region 112. Each interstitial preferably includes at least one width dimension that is less than the thickness of the tactile layer 110. For example, the tactile layer 110 can be 1 mm thick and a maximum gap between two adjacent beads within the cavity 125 can be only 0.1 mm. Such a relatively large ratio of tactile layer 110 thickness to bead gap (e.g., 10:1) may yield the benefit of reducing or eliminating undesired tactilely distinguishable surface features at the tactile surface 115, such as caused by a non-continuous support member 160 (e.g., disconnected beads) beneath the deformable region 112. However, the bead(s) may be of any other form or dimension. In the variation in which at least one bead is smaller in cross section than the fluid channel 138, a filter or a constriction can be arranged within the cavity 125, within the fluid channel 138, and/or within the displacement device 130 to prevent displacement of a bead away from the cavity 125 or to prevent the bead from obstructing operation of any other component, such as the displacement device 130. The beads can also be microbeads, such as with a width dimension (e.g., diameter) less than 0.001 mm, though the beads can be of any other width or diameter.

As shown in FIGS. 23 and 25, the support member 160 can alternatively be a free piston arranged within the cavity 125 and configured to communicate a force on the tactile layer 110 at the deformable region 112 into the substrate 120. The free piston can be any of a cylindrical-, rectangular-, or tetrahedral-shaped structure, or a structure of any other form. However, the free piston preferably fits within the cavity 125 with appropriate clearance between an inner surface of the cavity 125 and an outer surface of the piston to permit substantially free (uninhibited) motion of the free piston within the cavity 125. Specifically, the free piston is preferably undersized for the cavity 125 such that fluid can fill the gap there between. In the variation in which the substrate 120, support member 160, and tactile layer 110 are substantially transparent or translucent, the fluid is preferably of a refractive index substantially similar to that of the substrate 120 and/or the support member 160 to reduce optical distortion of an image transmitted there through. Specifically, the support member 160 is preferably substantially optically indistinguishable in the visible spectrum from the substrate 120, the fluid, and the tactile layer 110.

In the variation in which the support member 160 is a free piston, the free piston can provide additional tactile guidance in the form of click feedback. The free piston preferably provides click feedback at the tactile surface 115 of the deformable region 112 given an input at the deformable region 112. For example, a user touch on the tactile surface 115 of the deformable region 112 can compress the free piston, wherein compression of the free piston past a compression limit releases a spring within the free piston to provide an impulse into the tactile layer and against the user touch. Alternatively, the free piston can include any number of cams, springs, levers, or trips to provide click feedback given the input on the tactile surface 115. However, the support member 160 that is continuous with the substrate 120 can provide the same or similar functionality.

In this second variation, the support member 160 preferably is preferably of the same material as the substrate 120. This may be particularly beneficial in the variation in which an image is transmitted through the substrate 120 and the tactile layer 110, since the refractive index of the support member 160 can be matched to the refractive index of the substrate 120. Coupled with a fluid with optical properties (e.g., refractive index, color, clarity, etc.) substantially similar to that of the substrate 120, cavity surfaces and support member surfaces may be substantially indistinguishable to the naked eye, thus enabling substantial optical clarity in the user interface 100 that also provides the functionality of a dynamic tactile surface. This may be particularly useful in devices in which the user interface 100 is installed over or incorporates a digital display 150, such as for a smart phone or tablet computer. The support member 160 can alternatively be a porous polymer, a ceramic, a gel, or any other suitable material or combination of materials.

The support member 160 can further include a metallic or magnetic material. For example, a plurality of beads of the support member 160 can be aligned, moved, or otherwise displaced by inducing a magnetic or electric field across a portion of the cavity 125, as sown in FIGS. 22A and 22B. This may provide the benefit of aligning the beads in either setting, which may yield the benefit of minimizing surface abnormalities at the tactile surface 115 caused by the beads in either setting. The beads of the support member can also be arranged to selectively modify the transmission of light into the tactile layer no. For example, the beads can be polarized such that arrangement of the beads in one direction (in one setting) reduces light transmission from the substrate 120 through the tactile layer 110 at the deformable region 122 (e.g., FIG. 22A), and arrangement of the beads in a different direction (in the other setting) increases light transmission from the substrate 120 through the tactile layer no at the deformable region 112 (e.g., FIG. 22B). However, the beads can be arranged in any other way to achieve any other desired function. Furthermore, the beads can be connected through elastic bands, netting, or other mechanical features extending from one bead to another and retaining the beads is relatively constant formation. Alternatively, the beads can be ionized or magnetized such that the beads electrically or magnetically retain each other in a relatively constant position.

In this variation, the support member 160 can be die formed, die cast, injection molded, sintered, or produced in any other way. The support member 160 is also preferably substantially smooth on all external surfaces to reduce optical distortion of light passing there through. However, the support member 160 can further include any number of bores or fluid pathways to permit fluid to pass there through.

2D. Displacement Device

As shown in FIGS. 10A and 10B, the displacement device 130 of the second preferred embodiment functions to displace fluid into the cavity 125 to transition the deformable region 112 from the retracted setting to the expanded setting, wherein the expanded setting is tactilely distinguishable from the retracted setting at the tactile surface 115. The displacement device 130 is preferably connected (e.g., fluidly coupled) to the cavity 125 through the fluid channel 138, wherein the displacement device 130 modifies the pressure within the fluid channel 138 (and the cavity 125) to displace fluid into and/or out of the cavity 125. The displacement device 130 is therefore preferably a pump. The pump can be: a mechanical pump that generates a pressure differential to motivate the fluid; an electrical pump that generates an electrical field across portions of the fluid to induce electroosmotic flow; or a magnetic pump that generates a magnetic field across a portion of the fluid that is a magnetorheological fluid to induce magnetorheological flow. In the variation in which the displacement device 130 induces electroosmotic magnetorheological fluid flow, fluid can be direction through the fluid channel 138, across a portion of the cavity, and/or through portion of the support member 160 that includes a plurality of beads that are porous of include fluid pathways. For example, an electric field can be applied across the beads, wherein microfluidic channels within the beads permit electroosmotic flow not otherwise possible in the fluid channel 138 that is much larger in cross section. However, the displacement device 130 can be any other suitable device configured to move fluid through the fluid channel 138 to transition the deformable region 112 from the retracted setting to the expanded setting. The displacement device 130 is also preferably configured to transition the deformable region 112 from the expanded setting to the retracted setting, such as by drawing fluid from the cavity 125. Furthermore, as shown in FIG. 24, the displacement device 130 can be coupled to and/or include a reservoir 132 configured to store excess fluid. The displacement device 130 can be manually powered, such as by the user, or electrically powered, such as by sourcing electrical energy from a battery installed in the electronic device in which the user interface 100 is incorporated. However, the displacement device 130 can function in any other way and be powered by any other means.

In the retracted setting, the tactile surface 115 of the deformable region 112 is preferably flush with the tactile surface 115 of the undeformable region 114. Furthermore, in the retracted setting, the deformable region 112 is preferably in contact with the support member 160 such that the support member 160 supports the deformable region 112 and substantially resists inward deformation of the deformable region 112 given an input (e.g., touch or other force) applied to the tactile surface 115 at the deformable region 112. This may yield the benefit of substantially eliminating a user perception of a divot in the tactile layer 110 as the user touches or otherwise provides an input on the tactile surface 115. However, the support member 160 can be offset from the attachment face 122 of the substrate 120, as shown in FIG. 24. For example, the substrate 120 can be offset below the attachment face 122, such as by 1 mm such that, in the retracted setting, the deformable region 112 rests on the support member 160 and the tactile surface 115 of the deformable region 112 is also offset below the tactile surface 115 of the undeformable region 114. In this example, the tactile surface 115 of the deformable region 112 can be flush with or offset above the tactile surface 115 of the undeformable region 114 in the expanded setting, or in any other relative position. In another example of the retracted setting, the tactile surface 115 of the deformable region 112 is flush with the tactile surface 115 of the undeformable region 114 but the support member 160 is offset below the attachment face 122 to provide a user with tactile feedback as the deformable region 112 is depressed onto the support member 160 given the input at the tactile surface 115.

In the expanded setting, the deformable region 112 is preferably lifted off of the support member 160, as shown in FIG. 6B. Furthermore, in the expanded setting, the tactile surface 115 of the deformable region 112 is preferably no longer flush with the tactile surface 115 of the undeformable region 114, thereby defining a tactilely distinguishable formation at the tactile surface 115. However, the expanded and retracted settings can define any other formations on the tactile surface 115 of the deformable region 112, and the deformable region 112 can be in contact with the deformable region 112 in any suitable setting.

2E. Sensor

Figure 22B:
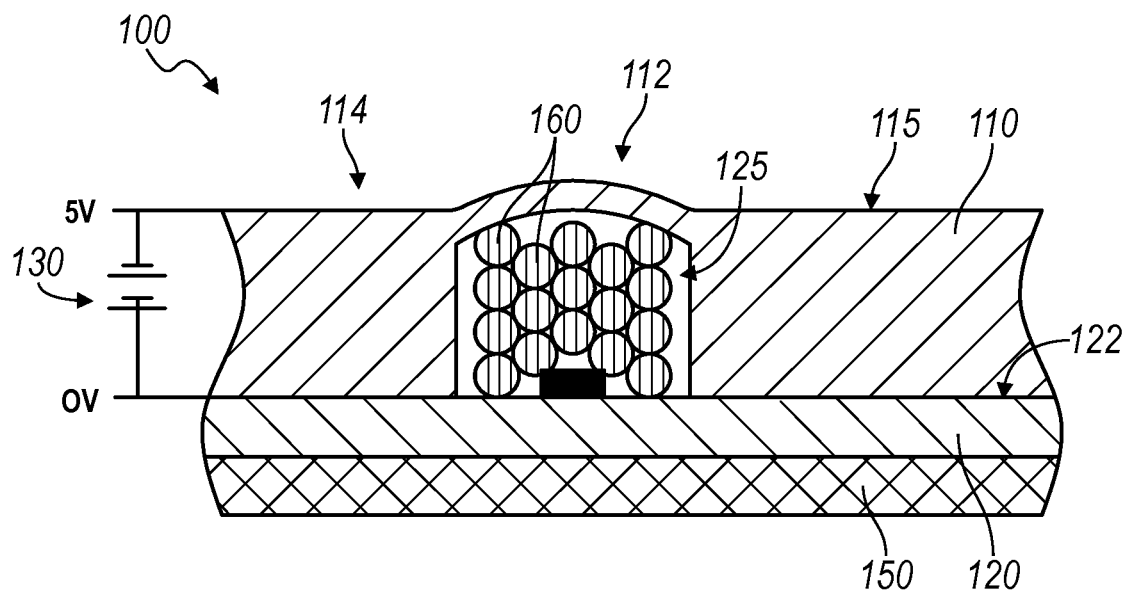

The sensor 140 of the second preferred embodiment functions to detect the input at the tactile surface 115. The sensor 140 can detect an input at the deformable region 112 of the tactile surface 115 and/or at the undeformable region 114 of the tactile surface 115. The input is preferably a user touch with one or more fingers, a palm, or a stylus, though the input can be by any other input device or extremity of the user. The sensor 140 can be arranged within the cavity (as shown in FIGS. 22A and 22B), within the tactile layer 110, within the substrate 120, or within a display 150 coupled to the substrate 120 opposite the tactile layer 110. Alternatively, the sensor 140 can be arranged between two or more aforementioned elements such as the display 150 and the substrate 130, as shown in FIG. 2. In one variation, the sensor 140 is a pressure sensor 140 coupled to the cavity 125, such as within the cavity 125 or connected to the fluid channel 138, wherein an input on the tactile surface 115 deforms the deformable region 112 and causes an increase in fluid pressure within the cavity 125, which is captured by the sensor 140. In another variation, the sensor 140 is a capacitive touch sensor 140 that incorporates two or more conductors (or electrodes), wherein a deformation of the tactile surface 115 modifies the distance between the electrodes, which is captured by the sensor 140. In yet another variation, the sensor 140 is an optical sensor 140 such that a deformation of the tactile layer 110 obstructs a beam of light, wherein the optical sensor 140 detects the obstruction as an input on the tactile surface 115. However, the sensor 140 can be any other type of sensor 140 and function in any other way.

3. Third Preferred Embodiment

As shown in FIG. 22A, the user interface 100 of the third preferred embodiment includes: a volume of fluid 170, a substrate 120, a tactile layer 110, a support member 160, a displacement device 130, and a sensor 140. The tactile layer 110 preferably includes an outer tactile surface 115, wherein a deformable region 112 of the tactile layer 110 cooperates with the substrate 120 to define the cavity 125, and an undeformable region 114 of the tactile layer 110 is coupled to the substrate 120 substantially proximal a perimeter of the cavity 125. The support member 160 is arranged within the cavity 125 and of a refractive index substantially similar to the refractive index of the volume of fluid 170. The support member 160 is also disconnected from the deformable region 112 and configured to support the deformable region 112 against substantial inward deformation. The displacement device 130 is configured to transition the deformable region 112 from a retracted setting to an expanded setting tactilely distinguishable from the retracted setting at the tactile surface 115. In the expanded setting, a portion of the volume of fluid 170 substantially fills the volume between the support member 160 and the deformable region 112. The sensor 140 is coupled to the substrate 120 and configured to detect an input on the tactile surface 115.

Like the user interface 100 of the second preferred embodiment, the user interface 100 of the third preferred embodiment functions to selectively provided tactile guidance at the tactile surface 115. The tactile layer 110 selectively transitions between the retracted and expanded settings to modify a form of the tactile surface 115 at the deformable region 112. The deformable region 112 preferably defines a raised button at the tactile surface 115 in the expanded setting, as shown in FIG. 6B, though the deformable region 112 can define any of a ridge, a ring, a slider, a joystick or any other form to define an input region, as shown in FIGS. 11 through 15. Alternatively, the deformable region 112 can define a guide or ridge around or adjacent an input region, wherein the deformable region 112 provides tactile guidance when a user generates the input at the input region.

The user interface 100 is preferably implemented in an electronic device, such as an automotive console, a desktop computer, a laptop computer, a tablet computer, a television, a radio, a desk phone, a mobile phone, a smartphone, a PDA, a personal navigation device, a personal media player, a camera, a watch, or any other electronic device incorporating a digital display. Alternatively, the user interface 100 can be implemented in an electronic device or any other device not incorporating a display, such as a roll-out keyboard, a control unit for a machine tool (e.g., Haas VF-o CNC), a keypad lock, a vending machine, a steering wheel, a gaming controller, a television remote control, a computer mouse or touchpad, an elevator control pad, or any other suitable device. However, the user interface 100 can be incorporated into an electronic or other device in any other way and provide any other suitable tactile guidance to the user.

The refractive index of the volume of fluid 170 is preferably substantially similar to that of the support member 160 such that the support member 160 is substantially optically indistinguishable (in the visible spectrum) from the fluid 170 and/or the substrate. The refractive index of the tactile layer 110 can also be substantially similar to that of the support member 160 such that the support member 160 is substantially optically indistinguishable (in the visible spectrum) from the tactile layer 110. Other optical properties or qualities of the components of the user interface 100 can also be substantially similar, such as a color or level of transparency, such that distinct components of the user interface too and edges or surfaces within the cavity 125 are substantially optically indistinguishable by a user. However, material (and geometry) for any component of the user interface too can additionally or alternatively be selected based upon just noticeable difference (jnd) of one or more optical qualities or properties of the system. Specifically, materials and/or optical qualities for certain components can be selected based upon statistical data (e.g., from user testing and surveys) regarding what materials are (barely) optically detectable or distinguishable by a group or set of users. However, material selection of any of the support member 160, the volume of fluid 170, and/or any other component of the user interface 100 can be based upon any other qualitative or quantitative property.

3B. Volume of Fluid

The volume of fluid 170 of the third preferred embodiment functions to aid transmission of light through substrate 120, the support member 160 and the tactile surface 115. The volume of fluid 170 is preferably substantially translucent or transparent and of a refractive index substantially similar to that of at least one of the substrate 120, the support member 160, and the tactile layer 110. The fluid is preferably substantially incompressible and is preferably in a liquid state throughout most operating temperatures and pressures of the user interface 100. However, the fluid can also be a gas or vapor throughout any period of operation of the interface device. The fluid can be water, alcohol, oil, air, nitrogen, or any other suitable fluid. Furthermore, in the variation in which the displacement device 130 directly modifies a portion of the volume of fluid 170 to transition the deformable region 112 between settings, the fluid can further include additives that functions to interact with the displacement device 130. For example, the fluid can contain magnetic particulate such that a magnetic field induced by the displacement device 130 generates flow in the fluid, such as toward one end of the cavity 125 or through the fluid channel 138. However, the fluid can be of any other liquid or gas and have any other suitable properties.

3B. Substrate

Like the substrate 120 of the second preferred embodiment, the substrate 120 of the third preferred embodiment preferably functions to support the tactile layer 110 at the undeformable region 114 and to cooperate with the tactile layer 110 to define the cavity 125. In the variation in which the displacement device 130 is configured to displace fluid into and out of the cavity 125 to transition the deformable region 112 between the retracted and expanded settings, the substrate 120 can further define a fluid channel 138, as described above. The substrate 120 preferably defines an attachment face 122 adjacent the undeformable region 114 of the tactile layer 110, wherein the attachment face 122 substantially retains and supports the undeformable region 114 against deformation due to an input on the tactile surface 115 of the undeformable region 114.

The substrate 120 is preferably continuous and planar across the attachment surface 122, which is adjacent the undeformable region 114 of the tactile layer 110, as shown in FIG. 22A. However, the substrate 120 can also define a surface curved about two or three dimensions, as shown in FIG. 23A.

The substrate 120 is preferably substantially translucent and can be further transparent to allow light (e.g., from a display 150) to pass there through substantially unobstructed. As described above, the substrate 120 can be any of glass, an acrylate polymer (e.g., poly(methyl methacrylate)), polycarbonate, or any other suitable material, and the cavity 125 can be formed in the substrate 120 via conventional machining (e.g., milling, drilling), chemical etching (e.g., bulk micromachining), electrode erosion (e.g., wire EDM), stamping, forming, forging, injection molding, casting, embossing, or any other suitable manufacturing technique. The substrate 120 can also include multiple layers stacked and joined to define the fluid channel 138 and/or the recess. The substrate 120 can further cooperate with any other layer, such as a display 150 coupled to the substrate 120 opposite the tactile layer 110, to define the fluid channel 138.

3C. Tactile Layer

Like the tactile layer 110 of the second preferred embodiment, the tactile layer 110 of the third preferred embodiment includes the deformable region 112 and the undeformable region 114 and preferably functions to cooperate with the substrate 120 to define the cavity 125. As described above, the undeformable region 114 is coupled to the substrate 120 substantially proximal the perimeter of the cavity 125, which functions to: retain the tactile layer 110 against the substrate 120; to define a perimeter, shape, and/or form of the tactile surface 115 at the deformable region 112 when offset from the undeformable region 114 in either setting; and/or to substantially seal the cavity 125 to prevent leakage of fluid there from. The deformable region 112 is not coupled or otherwise attached directly to the substrate 120 and is therefore substantially free to deform, such as outwardly to define a button on the tactile surface 115 or inwardly to define a recess or guide for a finger.

As shown in FIG. 6A, the tactile surface 115 is preferably continuous across the deformable and undeformable regions 112, 114. The tactile layer 110 is also preferably of constant thickness across the deformable and undeformable regions 112, 114. However, the tactile layer 110 can also be of non-uniform thickness across deformable and undeformable regions 112, 114, such as in the variation in which the tactile layer 110 defines the recess of the cavity 125 (shown in FIG. 22A). Furthermore, the tactile layer 110 is preferably substantially translucent and can be further transparent to permit light (e.g., from a display 150) to pass there through substantially unobstructed. The tactile layer 110 can be any of an acrylate polymer (e.g., poly(methyl methacrylate)), polycarbonate, a silicon-based elastomers (e.g., poly-dimethylsiloxane (PDMS), RTV Silicone), or any other suitable material or combination of materials and can include any suitable number of layers of one or more materials. The deformable region 112 of the tactile layer 110 is preferably substantially flexible (e.g., elastic) to permit repeated transitions between the expanded and retracted settings.

3D. Support Member

Like the support member 160 of the second preferred embodiment, the support member 160 of the third preferred embodiment preferably functions to support the deformable region 112 against substantial inward deformation. The support member 160 is arranged within the cavity 125, disconnected from the tactile layer 110, and can be disconnected from the substrate 120. The support member 160 preferably further supports the deformable region 112 to reduce or substantially eliminate tactile inconsistencies (e.g., divots) on the tactile surface 115 in at least one setting, which may yield the benefit of suggesting to a user that the substrate 120 and tactile layer 110 are continuous in the at least one setting.

As described above, the support member 160 can be attached to the substrate 120, as shown in FIGS. 6A and 24, wherein the support member 160 extends into the cavity 125 to support the deformable region 112 against substantial deformation into the cavity 125. In this variation, the support member 160 also preferably defines at least one fluid conduit configured to communicate fluid toward the deformable region 112, as shown in FIG. 6B.

Figure 23B:
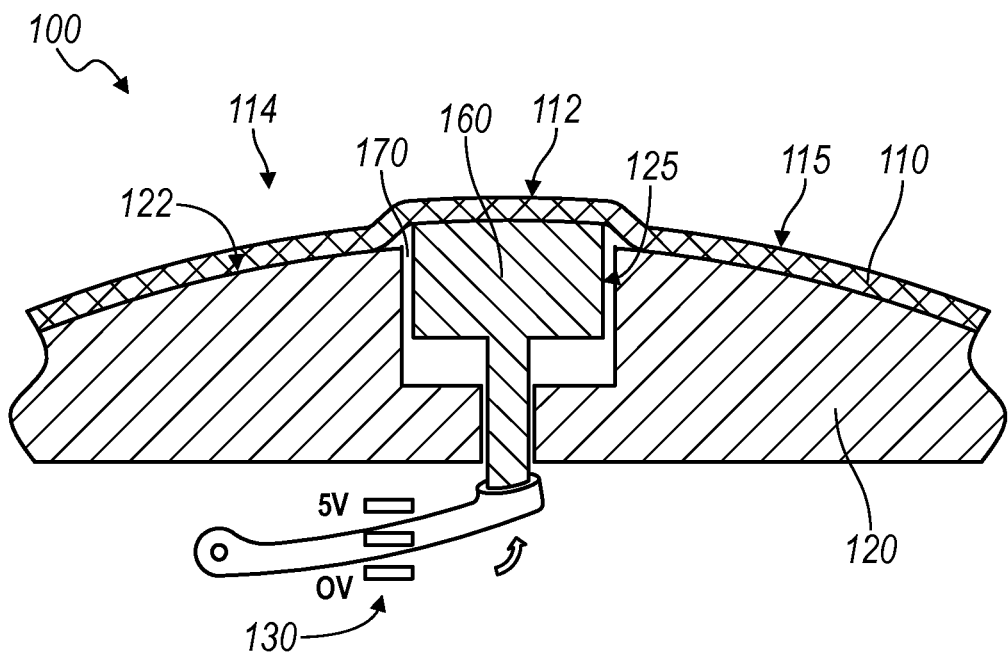
Figure 25A:
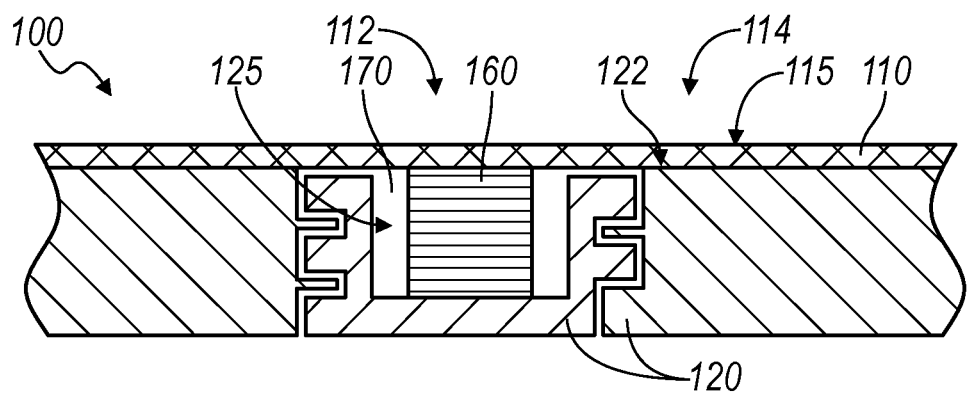
FIGS. 25a and 25b are schematic views of one version of the displacement device in accordance with another preferred embodiment of the present invention.

As described above, the support member 160 is disconnected from both the substrate 120 and the tactile layer 110. In this second variation, the support member 160 can be one or more beads that substantially fill the cavity 125 and support the deformable region 112 of the tactile layer 110 by transferring a force on the tactile surface 115 through adjacent beads and into the bottom of the cavity 125 (defined by the substrate 120). Alternatively, the support member 160 can be a free piston arranged within the cavity 125 and configured to communicate a force applied to the tactile layer 110 at the deformable region 112 into the substrate 120, as shown in FIG. 25A. Furthermore, in this variation, the free piston is preferably undersized for the cavity 125 such that the piston can move freely therein, as shown in FIGS. 23A and 23B. However, the support member 160 can be of any other form and include any other number of beads, pistons, or other elements.

In this second variation and as described above, the support member 160 preferably includes substantially the same or similar material as the substrate 120. This may be particularly beneficial in the variation in which an image is transmitted through the substrate 120 and the tactile layer 110, since the refractive index of the support member 160 can be matched to the refractive index of the substrate 120. Furthermore, the fluid preferably fills all volumes within the cavity 125 (e.g., around the beads, piston, or other elements or features of the support member 160) to substantially optically hide edges and surfaces of the cavity 125 and elements therein in both the retracted and expanded settings. By substantially matching the optical properties (e.g., refractive index, color, clarity, etc.) of the substrate 120, support member 160, and/or fluid 170, surfaces within the cavity 125 may be substantially indistinguishable to the naked eye. This may enable a high level of optical clarity in the user interface 100 that also provides the functionality of a dynamic tactile surface.

In the variation in which the displacement device 130 interacts with support member 160 to transition the deformable region 112 between settings, the support member 160 can further include a metallic or magnetic material. For example, in the variation in which the support member 160 includes a plurality of beads, the displacement device 130 can induce an electrical field across a portion of the cavity 125 to displace at least a portion of the beads within the cavity 125 and thus modify the position (and setting) of the deformable region 112, as shown in FIGS. 22A and 22B. In another example, in the variation in which the support member 160 includes a free piston, the displacement device 130 can induce a magnetic field across a portion of the cavity 125 to displace the piston into the deformable region 112, thus transitioning the deformable region 112 from the retracted setting to the expanded setting. Alternatively, the support member 160 can be physically coupled to the displacement device 130, such as via a connecting rod or other lever, wherein the displacement device 130 modifies the orientation or position of the support member 160 within the cavity 125 to engage and/or disengage the deformable region 112 to transition the deformable region 112 between settings, as shown in FIGS. 23A and 23B. However, the support member 160 can be perpetually decoupled from the displacement device 130 or interact with the displacement device 130 to transition the deformable region 112 between settings in any other way.

3E. Displacement Device

Figure 26A:
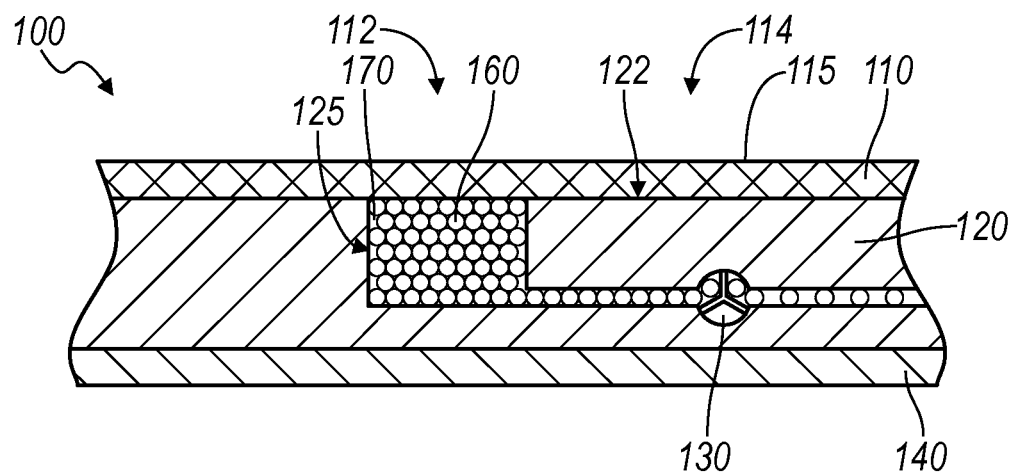
FIGS. 26a and 26b are schematic views of another version of the support member in accordance with another preferred embodiment of the present invention.
Figure 26B:
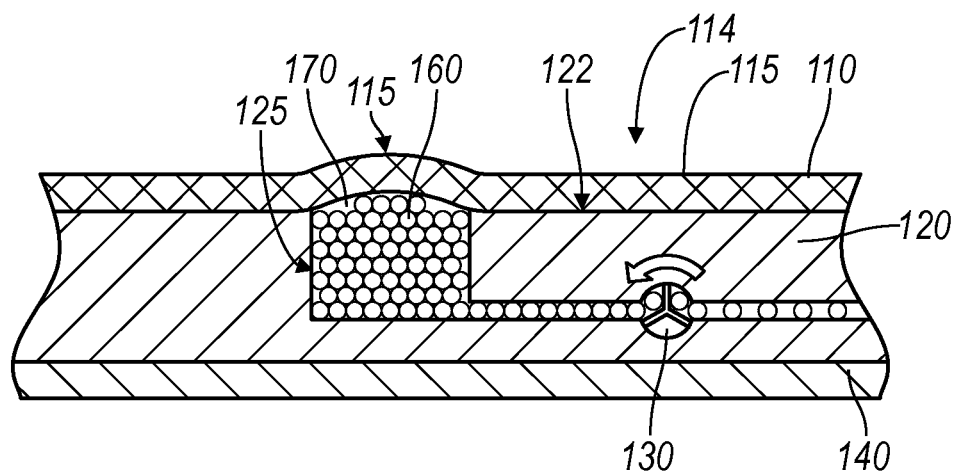

The displacement device 130 of the third preferred embodiment preferably functions to transition the deformable region 112 from the retracted setting to the expanded setting, wherein the expanded setting is tactilely distinguishable from the retracted setting at the tactile surface 115. As described above and like the displacement device 130 of the second preferred embodiment, the displacement device 130 can be a pump connected to the cavity 125 via a fluid channel 138, wherein the displacement device 130 modifies the pressure within the fluid channel 138 (and the cavity 125) to displace fluid into and/or out of the cavity 125. In this variation, the displacement device 130 can be any of a mechanical pump (shown in FIG. 24), an electrical pump, or a magnetic pump. In another variation, the displacement device 130 can modify the fluid within the cavity 125 directly, such as by heating the fluid with a heating element to expand the fluid or by generating a magnetic or electric field within the cavity 125, as described above. Alternatively, in the variation in which the support member 160 includes a plurality of beads, displacement device 130 can interact directly with the beads rather than with the fluid, wherein the displacement device 130 motivates beads through the fluid channel 138 and into the cavity 125, and vice versa, as shown in FIGS. 26A and 26B. Alternatively, the displacement device 130 can be a heater that heats the support member 160 that is a plurality of beads or a free piston, wherein the plurality of beads or a free piston expand under heating to displace fluid and transition the deformable region 112 between settings.

In yet another variation, the displacement device 130 can be mechanically, electrically, and/or magnetically coupled to the support member 160 to modify the position and/or orientation of the support member 160 within the cavity 125, wherein the support member 160 engages the deformable region 112 to transition between settings, as shown in FIGS. 23A and 23B. In this variation the displacement device 130 can include a linear actuator or solenoid that mechanically operates the support member 160. The displacement device 130 can also be one or more inductors that generate the magnetic field or a series of electrodes (or conductive pads) that generate the electric field to motivate the free piston within the cavity.

Figure 25B:
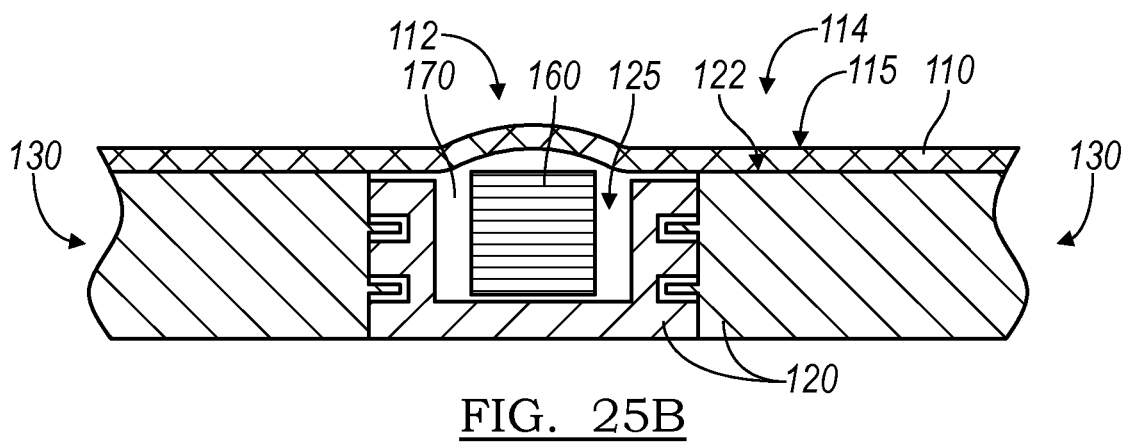

In a further variation, the displacement device 130 can modify the tactile layer 110 directly, such as by imparting a force across a portion of the tactile layer 110 to wrinkle, scrunch, or stretch the deformable region 112 between the expanded and retracted settings. For example and as shown in FIGS. 25A and 25B, the displacement device 130 can shift the position of one or more portions of the attachment face 122 to stretch the deformable region 112 in the retracted setting, then relax the tactile layer 110 to transition the deformable region 112 to the expanded setting. In this example, the tactile layer 110 can include a shape memory material such that the deformable region 112 returns to a raised or indented surface in the relaxed setting. The displacement device 130 can again be an actuator or solenoid. In another example, the displacement device 130 can induce a voltage potential across a portion of the tactile layer 110 to wrinkle or relax the portion thereof. In this example, the tactile layer 110 can include doped latex that changes form, thickness, elasticity, or other mechanical or physical property in the presence of an electric field, and the displacement device 130 can again include a series of electrodes or conductive pads. However, the displacement device 130 can interface with any other element or number of elements and functions in any other way.

As described above, in the retracted setting, the tactile surface 115 of the deformable region 112 is preferably flush with the tactile surface 115 of the undeformable region 114. Furthermore, in the retracted setting, the deformable region 112 is preferably in contact with the support member 160 such that the support member 160 supports the deformable region 112 and substantially resists inward deformation of the deformable region 112 given an input (e.g., touch or other force) applied to the tactile surface 115 at the deformable region 112, as shown in FIG. 6A. In the expanded setting, the deformable region 112 is preferably lifted off of the support member 160. Furthermore, in the expanded setting, the tactile surface 115 of the deformable region 112 is preferably no longer flush with the tactile surface 115 of the undeformable region 114, thereby defining a tactilely distinguishable formation at the tactile surface 115, as shown in FIG. 6B. However, the expanded and retracted settings can define any other tactilely distinguishable formations on the tactile surface 115 of the deformable region 112, and the deformable region 112 can be in contact with the support member 160 in the expanded, retracted, or any other setting.

3F. Sensor

Like the sensor 140 of the second preferred embodiment, the sensor 140 of the third preferred embodiment preferably functions to detect an input at the tactile surface 115. The sensor 140 can detect an input at the deformable region 112 of the tactile surface 115 and/or at the undeformable region 114 of the tactile surface 115. The input is preferably a user touch with one or more fingers, a palm, or a stylus, though the input can be by any other input device or extremity of the user. The sensor 140 can be arranged within the cavity 125, within the tactile layer 110, within the substrate 120, or within a display 150 coupled to the substrate 120 opposite the tactile layer 110. Alternatively, the sensor 140 can be arranged between two or more aforementioned elements. The sensor 140 can be any of a pressure sensor 140, a capacitive touch sensor 140, an optical sensor 140, or any other suitable type of sensor 140.

As a person skilled in the art of user interfaces will recognize from the previous detailed description and from the figures and claims, modifications and changes can be made to the preferred embodiments of the invention without departing from the scope of this invention defined in the following claims.

We claim:
1. A user interface comprising:
a substrate defining a fluid channel connected to a cavity;
a tactile layer comprising a tactile surface, a deformable region of the tactile layer cooperating with the substrate to define the cavity, and an undeformable region of the tactile layer coupled to the substrate substantially proximal a perimeter of the cavity;
a set of discrete beads arranged within the cavity and disconnected from the deformable region and the substrate, the set of discrete beads configured to support the deformable region against substantial inward deformation;
a filter arranged within the fluid channel and configured to prevent displacement of a bead, in the set of discrete beads, through a portion of the fluid channel and into the displacement device;
a displacement device coupled to the fluid channel and configured to displace fluid through the fluid channel to transition the deformable region from a retracted setting to an expanded setting that is tactilely distinguishable from the retracted setting at the tactile surface; and
a sensor coupled to the substrate and configured to detect an input at the tactile surface.

2. The user interface of claim 1, wherein an interstitial between beads in the set of discrete beads defines a fluid path configured to communicate fluid through the cavity, and wherein the fluid path comprises a width dimension less than a thickness of the tactile layer.

3. The user interface of claim 1, wherein a bead in the set of discrete beads is substantially spherical.

4. The user interface of claim 1, wherein each bead in the set of discrete beads comprises a material of a refractive index substantially similar to the refractive index of the fluid.

5. The user interface of claim 1, wherein, in the retracted setting, the tactile surface of the deformable region is flush with the tactile surface of the undeformable region and the deformable region is in contact with a bead in the set of discrete beads.

6. The user interface of claim 5, wherein, in the expanded setting, the deformable region is lifted off of the set of discrete beads.

7. The user interface of claim 1, wherein the touch sensor is a capacitive touch sensor.

8. The user interface of claim 1 incorporated into an electronic device selected from the group consisting of: an automotive console, a desktop computer, a laptop computer, a tablet computer, a television, a radio, a desk phone, a mobile phone, a PDA, a personal navigation device, a personal media player, a camera, and a watch.

9. The user interface of claim 1, wherein the filter comprises a constriction of cross-section area less than a cross-sectional area of a bead in the set of discrete beads, the constriction arranged at a junction between the fluid channel and the cavity.

10. The user interface of claim 1, wherein the filter is permeable to the volume of fluid but impermeable to beads in the set of discrete beads.

11. A user interface comprising:
a volume of fluid;
a substrate;
a tactile layer comprising a tactile surface, a deformable region of the tactile layer cooperating with the substrate to define a cavity, and an undeformable region of the tactile layer coupled to the substrate substantially proximal a perimeter of the cavity;
a set of discrete beads arranged within the cavity and disconnected from the deformable region and the substrate, the set of discrete beads configured to support the deformable region against substantial inward deformation, and beads in the set of discrete beads of a refractive index substantially similar to a refractive index of the volume of fluid;
a displacement device fluidly coupled to the cavity and configured to displace a portion of the volume of fluid into the cavity to transition the deformable region from a retracted setting to an expanded setting, the tactile surface in the expanded setting tactilely distinguishable from the tactile surface in the retracted setting;
a filter arranged within the cavity and configured to prevent displacement of a bead, in the set of discrete beads, into the displacement device; and
a sensor coupled to the substrate and configured to detect an input on the tactile surface.

12. The user interface of claim 11, wherein an interstitial between beads in the set of discrete beads defines a fluid path configured to communicate fluid through the cavity wherein the fluid path comprises a width dimension less than a thickness of the tactile layer.

13. The user interface of claim 11, wherein a portion of the volume of fluid substantially fills the cavity in both the retracted and expanded settings.

14. The user interface of claim 11, wherein the substrate further defines a fluid channel connected to the cavity and to the displacement device, wherein the displacement device comprises a pump configured to displace a portion of the volume of fluid through the fluid channel to transition the deformable region from the retracted setting to the expanded setting, and wherein the filter is arranged at a junction between the cavity and the fluid channel.

15. The user interface of claim 11, wherein a portion of the fluid fills the cavity to transmit light from the substrate through the tactile layer in both the retracted and the expanded settings.

16. The user interface of claim 11, wherein the displacement device is configured to modify a mechanical property of the tactile layer at the deformable region to transition the deformable region between settings.

17. The user interface of claim 16, wherein the displacement device is configured to generate a voltage potential across a portion of the tactile surface to modify the elasticity of the deformable region.

18. The user interface of claim 11, wherein the displacement device is configured to generate a voltage potential across a portion of the cavity to displace fluid within the cavity to transition the deformable region between settings.

19. The user interface of claim 11, further comprising a display coupled to the substrate and configured to visually output an image of an input key substantially aligned with the deformable region.

20. The user interface of claim 19, wherein a portion of the volume of fluid, the substrate, the tactile layer, and the set of discrete beads are configured to visually transmit the image from the display through the tactile surface.

21. The user interface of claim 11, wherein in the retracted setting, the deformable region is in contact with at least one bead in the set of discrete beads, and wherein in the expanded setting, the deformable region is lifted off of the set of discrete beads.

22. The user interface of claim 11, wherein the deformable and undeformable regions are continuous, and wherein in the retracted setting, the tactile surface of the deformable region is substantially in plane with the tactile surface of the undeformable region.

* * * * *